United States Patent [19]
Pryor

[11] Patent Number: 5,871,391
[45] Date of Patent: Feb. 16, 1999

[54] APPARATUS FOR DETERMINING DIMENSIONS

[75] Inventor: Timothy R. Pryor, Windsor, Canada

[73] Assignee: Sensor Adaptive Machine Inc., Windsor, Canada

[21] Appl. No.: 71,012

[22] Filed: Jun. 2, 1993

Related U.S. Application Data

[63] Continuation-in-part of Ser. No. 884,331, May 18, 1992, abandoned, and a continuation-in-part of Ser. No. 770,728, Oct. 4, 1991, abandoned, which is a continuation of Ser. No. 577,086, Aug. 28, 1990, abandoned, which is a continuation of Ser. No. 346,284, May 1, 1989, abandoned, which is a continuation of Ser. No. 230,675, Aug. 9, 1988, abandoned, which is a continuation of Ser. No. 104,518, Sep. 28, 1987, abandoned, which is a continuation of Ser. No. 799,548, Nov. 18, 1995, abandoned, which is a continuation of Ser. No. 413,618, Sep. 1, 1982, abandoned, which is a division of Ser. No. 134,465, Mar. 27, 1980, Pat. No. 4,403,860, and a continuation-in-part of Ser. No. 848,937, Mar. 10, 1992, abandoned, which is a continuation of Ser. No. 509,295, Apr. 16, 1990, Pat. No. 5,112,131, which is a continuation of Ser. No. 042,527, Apr. 27, 1987, Pat. No. 5,012,574, which is a continuation of Ser. No. 767,374, Aug. 20, 1985, abandoned, which is a continuation of Ser. No. 560,259, Dec. 12, 1983, Pat. No. 4,559,684, which is a continuation of Ser. No. 238,702, Feb. 27, 1982, abandoned.

[51] Int. Cl.$^6$ ............................. B24B 29/00; G01B 11/30
[52] U.S. Cl. ................................. 451/9; 451/6; 356/371; 364/474.15; 364/474.16; 364/474.17
[58] Field of Search ........................ 451/6, 1, 9; 82/117, 82/118, 120, 121; 83/365; 356/371; 364/474.02, 474.15, 474.16, 474.17

[56] References Cited

U.S. PATENT DOCUMENTS

| | | | |
|---|---|---|---|
| 1,336,311 | 4/1920 | Martin | 408/16 |
| 2,249,121 | 7/1941 | Drescher | 356/392 |
| 2,303,651 | 12/1942 | Mason | 408/116 |
| 2,454,959 | 11/1948 | Barnes | 350/23 |

(List continued on next page.)

FOREIGN PATENT DOCUMENTS

| | | | |
|---|---|---|---|
| 463 417 | 2/1950 | Canada . | |
| 463417 | 3/1950 | Canada | 356/376 |
| 608 505 | 1/1935 | Germany . | |
| 608505 | 1/1935 | Germany | 356/396 |
| 3 958 | of 1880 | United Kingdom . | |
| 3958 | of 1880 | United Kingdom | 33/166 |
| 1 279 411 | 6/1972 | United Kingdom . | |
| 1279411 | 6/1972 | United Kingdom | 408/2 |

OTHER PUBLICATIONS

Mayes et al., "High Speed Image Capture for Mechanical Analysis", IBM Tech. Disc. Bull. Dec. 1973, pp. 2169–2171.

Pryor et al., "Laser Based Gauging/Inspection", Electro–Optical Systems Design, vol. 7, May 1975, pp. 26–31.

Buck, T.M., "A Silicon Diode Array for Image Sensing", Proc. Conf. on Semiconductor–Nuclear Particle Detectors and Circuits, Gatlinburg, TN, USA, pp. 306–310.

Mengers, P., "Digital Video Systems Applied to Product Inspection", SPIE vol. 170, 1979, pp. 43–50.

(List continued on next page.)

*Primary Examiner*—Jack W. Lavinder
*Attorney, Agent, or Firm*—Larson and Taylor

[57] ABSTRACT

The invention primarily concerns improvements to turning, grinding milling and other machining processes using electro-optical sensors for analyzing images or patterns related to tools used to work objects. Also disclosed are unique electro-optical sensing methods and apparatus in their own right, capable of high accuracy measurement required for modern industry. In a preferred embodiment of the invention, a two axis image analysis of the backlit tool edge is performed to determine tool position, damage, or wear, and where desired appropriate control steps taken to reposition or change the tool. In another preferred embodiment the tool itself is equipped with optically sensed contact members according to the invention to measure the part produced with the tool, or to determine the deflection of the tool.

15 Claims, 20 Drawing Sheets

U.S. PATENT DOCUMENTS

| | | | |
|---|---|---|---|
| 2,614,368 | 10/1952 | Polk et al. | 356/392 |
| 2,720,810 | 10/1955 | Senn | 356/373 |
| 2,880,309 | 3/1959 | Gallagher et al. | 356/43 |
| 2,994,962 | 8/1961 | Lebourg | 356/373 |
| 3,274,743 | 9/1966 | Naulapaa et al. | |
| 3,354,319 | 11/1967 | Loewen et al. | 250/237 R |
| 3,535,961 | 10/1970 | Sharp | 82/117 |
| 3,554,017 | 1/1971 | Wernsing | 33/561 |
| 3,599,004 | 8/1971 | Grendelmeier | 250/237.6 |
| 3,666,885 | 5/1972 | Hemsley . | |
| 3,817,647 | 6/1974 | Lemelson | 408/8 |
| 3,840,301 | 10/1974 | Pryor et al. | 356/354 |
| 3,973,119 | 8/1976 | Renes et al. | 356/396 |
| 3,983,376 | 9/1976 | Pozzetti | 408/2 |
| 4,021,119 | 5/1977 | Stauffer | 356/375 |
| 4,031,368 | 6/1977 | Colding | 356/371 |
| 4,180,329 | 12/1979 | Hildebrand | 356/23 |
| 4,190,767 | 2/1980 | Crouse | 250/231 SE |
| 4,204,230 | 5/1980 | Sprague | 358/213 |
| 4,213,245 | 7/1980 | Armstrong | 33/546 |
| 4,221,973 | 9/1980 | Nosler | 356/387 |
| 4,240,691 | 12/1980 | Holmquist et al. | 350/584 |
| 4,274,743 | 6/1981 | Naulapaa et al. | 356/387 |
| 4,275,505 | 6/1981 | Delmas | 250/231.1 |
| 4,305,661 | 12/1981 | Pryor et al. . | |
| 4,340,326 | 7/1982 | Buonauro et al. | 250/561 |
| 4,373,804 | 2/1983 | Pryor et al. | 356/1 |
| 4,403,860 | 9/1983 | Pryor | 356/375 |
| 4,576,482 | 3/1986 | Pryor . | |

OTHER PUBLICATIONS

Pryor et al., "Laser Based Gauging/Inspection", Electro–Optical Systems Design, vol. 7, May 1975, pp. 26–31.

Mayes et al. "High–Speed Image Capture for Mechanical Analysis", IBM Tech. Disc. Bull. Dec. 1973, pp. 2169–2171.

Pryor et al. "Laser Based Gauging/Inspection" Electro–Optical Systems Design, vol. 7, May 1975, pp. 26–31.

Buck, T.M. "A Silicon Diode Array for Image Sensing" Proc. Conf. on Semiconductor–Nuclear–Particle Detectors & Circuits Gatlinburg Tenn, USA, pp. 306–310.

Mengers P. "Digital Video Systems Applied To Product Inspection" SPIE vol. 170, 1979, pp. 43–50.

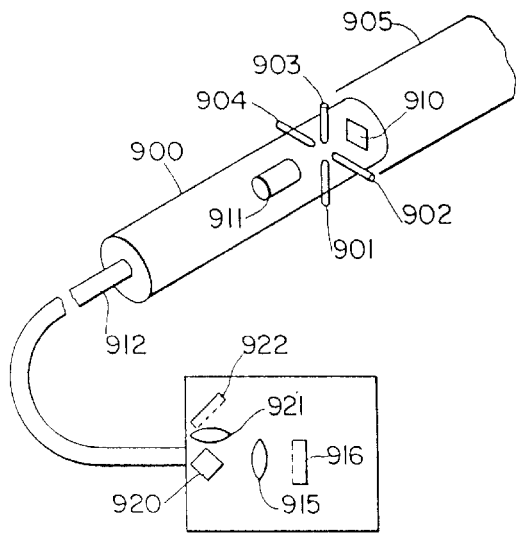
FIG. 11
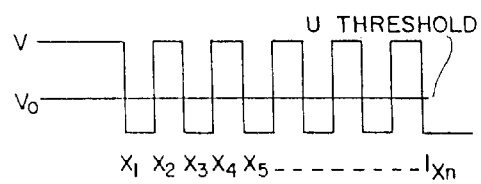
FIG. 12A
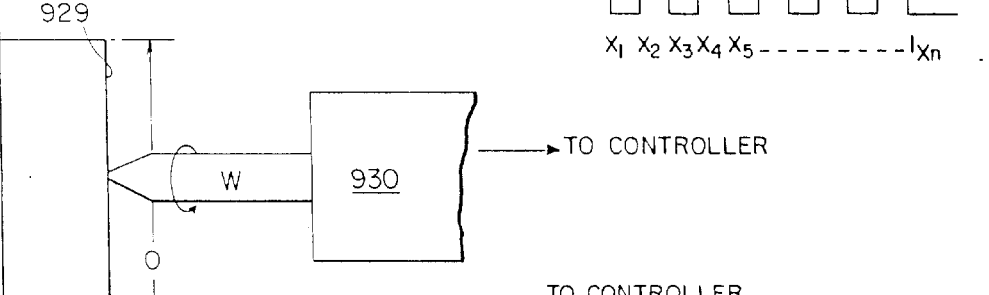
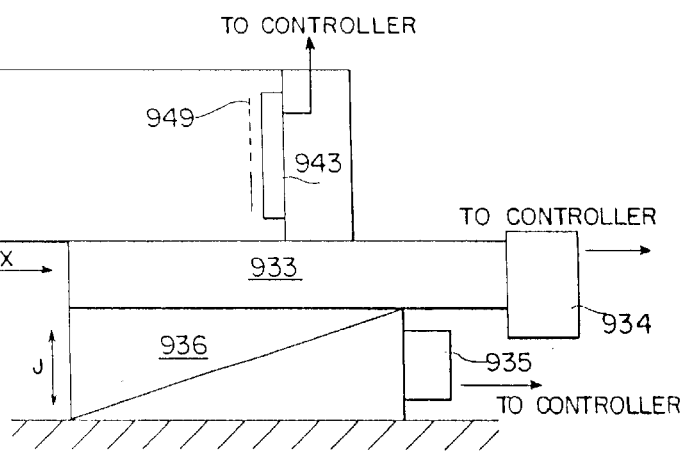
FIG. 12

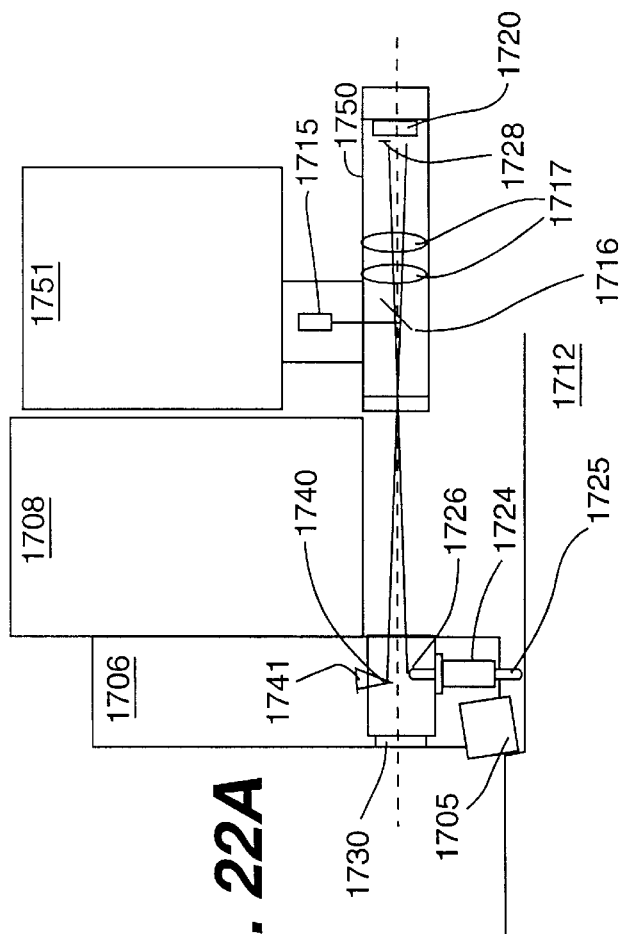
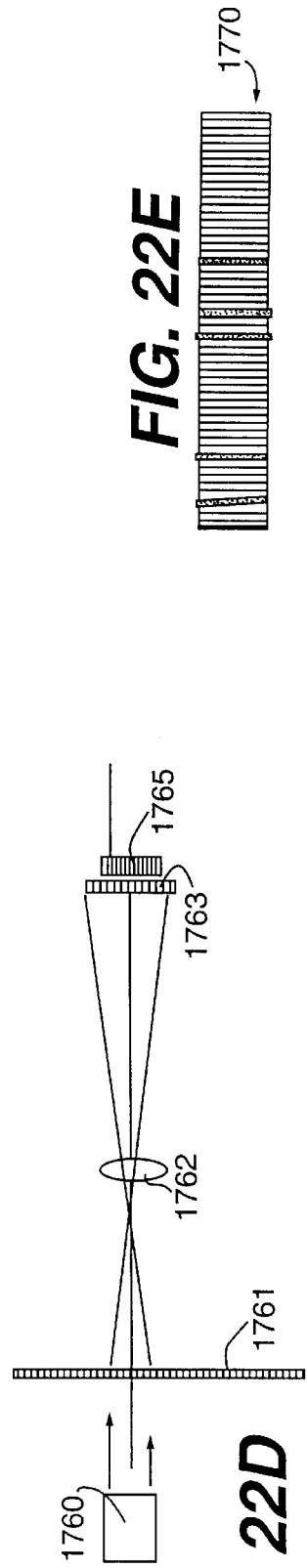

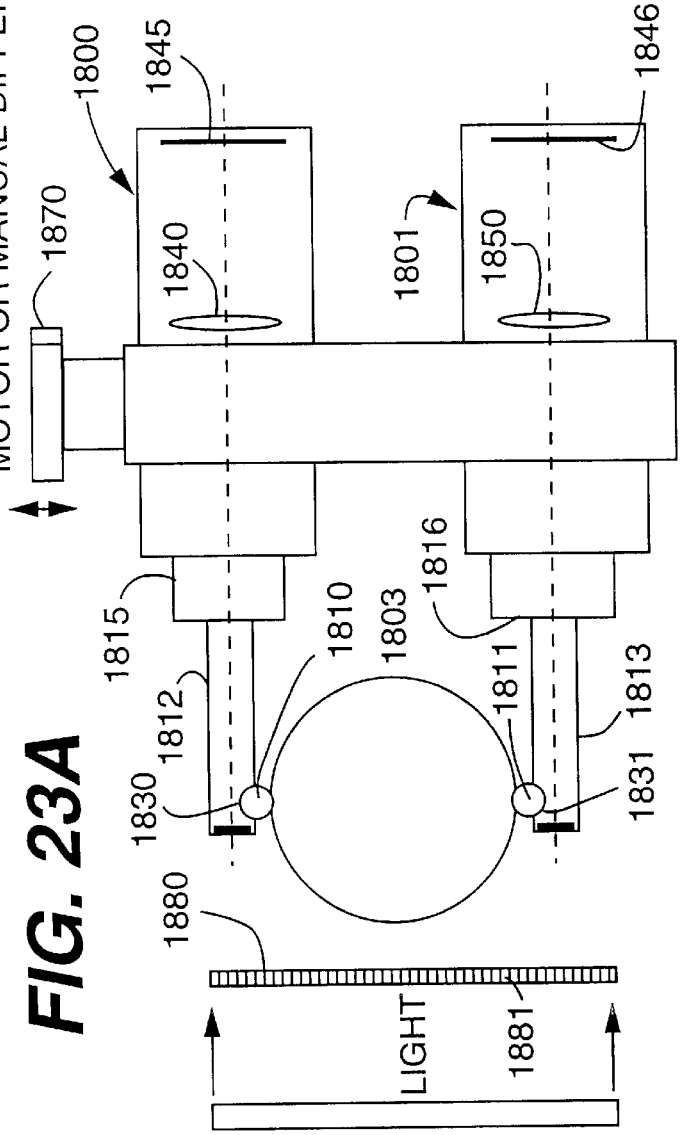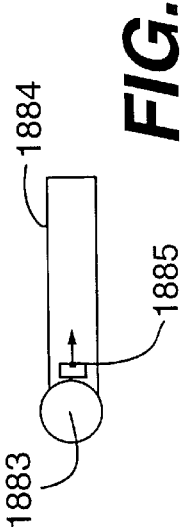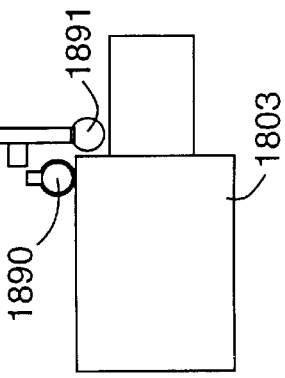

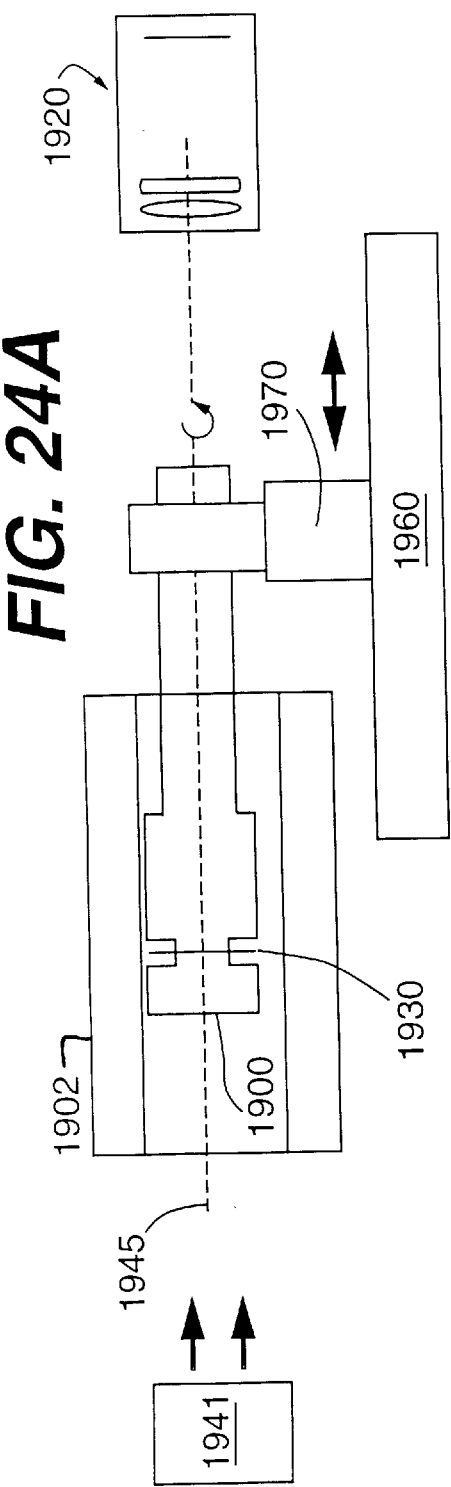
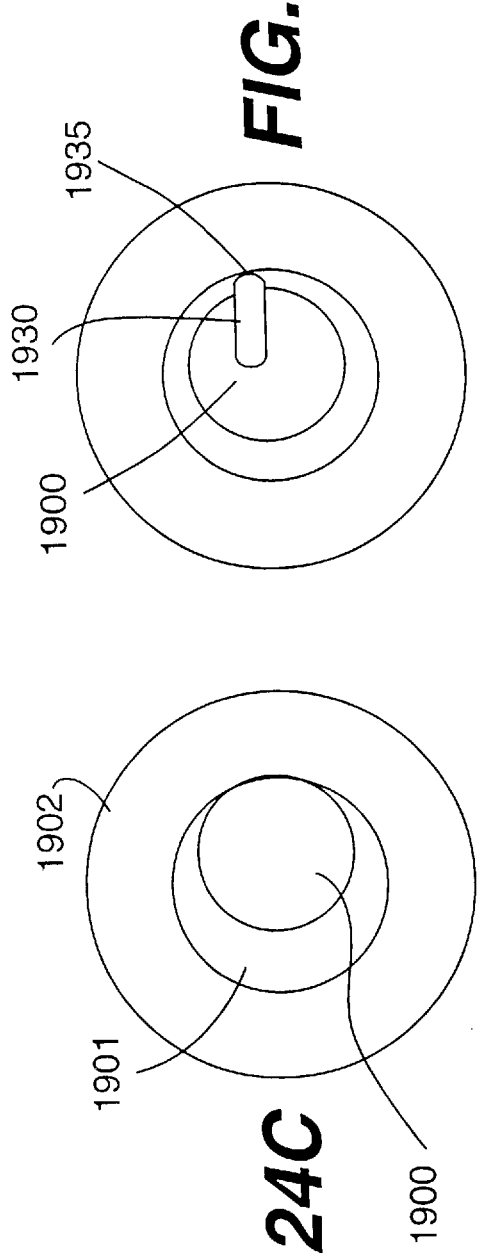
FIG. 24A
FIG. 24B
FIG. 24C

APPARATUS FOR DETERMINING DIMENSIONS

RELATED APPLICATIONS

This application is a continuation-in-part of application Ser. No. 07/884,331, filed May 18, 1992 now abandoned; and a continuation-in-part of application Ser. No. 07/770,728, filed Oct. 4, 1991, now abandoned, which was a continuation of application Ser. No. 07/577,086, filed Aug. 28, 1990, now abandoned, which was a continuation of Ser. No. 07/346,284, filed May 1, 1989, now abandoned, which was a continuation of Ser. No. 07/230,675, filed Aug. 9, 1988, now abandoned, which was a continuation of Ser. No. 07/104,518, filed Sept. 28, 1987, now abandoned, which was a continuation of Ser. No. 06/799,548, filed Nov. 18, 1985, now abandoned, which was a continuation of Ser. No. 06/413,618, filed Sept. 1, 1982, now abandoned, which was a division of Ser. No 06/134,465, filed Mar. 27, 1980, now U.S. Pat. No. 4,403,860; and a continuation-in-part of application Ser. No. 07/848,937, filed Mar. 10, 1992 now abandoned, which was a continuation of application Ser. No. 07/509,295, filed Apr. 16, 1990, now U.S. Pat. No. 5,112,131, which was a continuation of application Ser. No. 07/042,527, filed Apr. 27, 1987, now U.S. Pat. No. 5,012,574, which was a continuation of application Ser. No. 06/767,374, filed Aug. 20, 1985, now abandoned, which was a continuation of application Ser. No. 06/560,259, filed Dec. 12, 1983, now U.S. Pat. No. 4,559,684, which was a continuation of application Ser. No. 06/238,702, filed Feb. 27, 1982, now abandoned. The disclosures of the foregoing applications are hereby incorporated by reference.

REFERENCE TO OTHER U.S. PATENTS OF INTEREST

1. U.S. Pat. No. 4,373,804—Method and apparatus for electro-optically determining the dimension, location and attitude of objects.
2. U.S. Pat. No. 4,394,683—New photodetector array based optical measurement systems.
3. U.S. Pat. No. 4,453,085—Electro-optical systems for control of robots, manipulator arms and coordinate measurement machines.
4. U.S. Pat. No. 4,667,231—Electro optical part inspection in the presence of contamination and surface finish variation.
5. U.S. Pat. No. 4,774,751—Electro optical and robotic casting quality assurance.
6. U.S. Pat. No. 4,576,482—Electro-optical inspection.
7. U.S. Pat. No. 4,403,860—Apparatus for determining dimensions.
8. U.S. Pat. No. 4,574,199—Sensing location of an object.
9. U.S. Pat. No. 4,585,350—Pulsed Robotic Inspection.
10. U.S. Pat. No. 4,559,684—Controlled Machining of combustion chambers, gears, and other surfaces.

PRIOR ART

The known prior art in this field is generally represented by Lemelson U.S. Pat. No. 4,733,049 (and others with the same text) and Colding, U.S. Pat. No. 4,031,368. Both disclose electro-optical sensor means used to check tools for location, length, wear and damage in a machine tool, one of the preferred applications of the present invention. However, neither discloses workable electro-optical means to make the required measurements, which must be very precise in most instances to provide the reliable degree of control necessary for the process.

The Colding disclosure is by far the most detailed, but even it is very unclear as to how the tool is to be inspected for wear. Colding does however stipulate that he is determining flank wear and crater wear by reflecting light off the respective surfaces where such wear occurs. Lemelson too, specifies reflection of light from the tool. Such reliance on reflection is however extremely unreliable in practice due to the problems of reflection from surfaces varying in form, color, contamination and the like, where almost no contrast in some cases exists.

In the invention here described this problem is obviated by using edge images of the tool which are digitally sensed in machine to very high accuracies for their location and contour, from which wear can be directly measured, in so far as its reduction in cutting edge position (and the effect on part size and finish) is concerned. Only be means of equipment of the capability disclosed herein can such measurements be reliably made in a machine environment. While the edge image shape changes only slightly compared to the relatively large wear pattern indication on the surface of a tool, the increased accuracy of measurement more than makes up I feel in reliable system function.

Other aspects of the invention include optically sensed contact members in probes or tools, of which little direct prior art exists.

BACKGROUND OF THE INVENTION

The present invention relates to apparatus and methods for determining dimensions such as diameter, thickness, aperture size, bore size, and the like and for monitoring object dimension, tool position or tool form. At present, there are many devices for determining dimensions of various objects. For example, in modern industrial applications, it is well known to utilize contact points to transduce a dimension to an electronic transducer. In a typical application at the present time, such contact points would routinely touch the inner diameter of an engine cylinder bore. Linear Voltage Displacement Transducers (LVDT transducers) connected to the contact members, are provided to sense the location of the contact members and thus relate to the bore diameter.

Such electronic transduction systems using contacts have begun steadily replacing the air gages previously used which utilized air back-pressure against a surface of the object as the measuring variable. These air gages have the advantage of no contact between the object and the gage. The reason for the replacement of air gages is the much higher range, stability and maintainability of the electronic sensors which advantages offset the disadvantages caused by use of contact rather than non-contact measurement.

It is an object of the present invention to provide apparatus and methods for determining a dimension of an object and for monitoring object dimension, tool position and tool form in working on an object. It is a further object of the invent ion to provide such apparatus and methods which has advantages over the previously known devices and methods, such as those mentioned above, and which over-come several of the disadvantages thereof.

SUMMARY OF THE INVENTION

The foregoing and other objects which will be apparent to those of ordinary skill in the art are achieved in accordance with the present invention which provides, in one embodiment, apparatus for determining a dimension of an object, the apparatus comprising a support structure, means for positioning an object, a gage member mounted on the support, the gage member having a contact portion for contacting a surface of a positioned object and having a portion movable with the contact portion and comprising an edge, means for positioning the gage member in a contact position in which the contact portion is in contact with the surface whereby the edge position is proportional to a dimension of the object between a reference point of a positioned object and the surface of a positioned object contacted by the contact portion of the gage member, light source means for directing light onto the edge, light detector means comprising a plurality of light sensitive elements, each of the light sensitive elements being capable of producing an output signal in response to incident light, lens means for focussing an image of the edge on the light detector means, the image being formed by the light directed onto the edge, and means for analyzing the output signals from the light sensitive elements to determine the dimension between the reference point and the surface of a positioned object.

In one embodiment, the further edge is provided in a second gage member mounted on the support structure and having a contact end portion adapted to contact a second surface of an object and a non-contact portion movable with the contact portion and comprising the further edge, and the second gage member is also movable between withdrawn and object-contacting positions such that the edges of the first and second gage members are spaced apart a distance between the object surfaces contacted by the gage members. Thus, the apparatus is adapted to determine the distance between the contacted surfaces. The surfaces may be outside surfaces, whereby outside dimensions such as thickness may be determined, or inside surfaces, such as bore surfaces, whereby inside dimensions, such as bore diameter may be determined.

In another embodiment, the object is positioned such that a reference point—which may be in a surface, along an axis of rotation, or elsewhere—of the object is in a reference position. In this embodiment, the further edge is a reference edge positioned at a known distance from the reference point of a positioned object. When the first gage member is in its object-contacting position, the distance between the edge of the first gage member and the reference point is proportional to the gap between the edges. The apparatus is thus adapted to determine the distance between the reference point and the contacted surface of a positioned object. This embodiment has particular adaptability to apparatus in which the object is rotated relative to the gage member in which case the reference point is preferably the axis of rotation.

In a further variation of the embodiment just described, an elongate gage member is provided with a plurality of edges spaced apart known distances from one another all of which edges move with the contact portion of the gage. In this embodiment, the image of the edge spacing varies with the position of the gage member and thus provides an indication of the position of the contact portion of the gage member and thus of the surface contacted thereby.

In a still further embodiment there is provided means for monitoring object dimension, tool position or tool form in apparatus for working on an object with a tool which comprises a tool and means for supporting, in a working position, an object to be worked upon by the tool. The monitoring means comprises means for directing, during normal operation of the apparatus, electromagnetic radiation onto an edge of a member which contacts the portion of said object which is worked on to form a pattern of electromagnetic radiation which is characteristic of the position of said edge in the electromagnetic radiation directed thereto, and means for analyzing said pattern to determine the object dimension, tool position, or tool form during normal operation of the apparatus.

BRIEF DESCRIPTION OF THE DRAWINGS

There follows a detailed description of a preferred embodiment of the invention, together with accompanying drawings. However, it is to be understood that the detailed description and accompanying drawings are provided solely for the purpose of illustrating a preferred embodiment of the invention and that the invention is capable of numerous modifications and variations apparent to those skilled in the art without departing from the spirit and scope of the invention.

FIG. 11 is a diagrammatic perspective view of a seventh embodiment of the invention;

FIG. 12 is a diagrammatic side elevation view of an eighth embodiment of the invention;

FIG. 12A is graphical representation of data in a threshold detection system in accordance with the invention.

FIGS. 23(A–C) illustrates improved OD grinder sensing and control apparatus.

FIGS. 24(A–C) illustrates an ID Grinding embodiment.

DETAILED DESCRIPTION OF THE PREFERRED EMBODIMENTS

Figure 1:
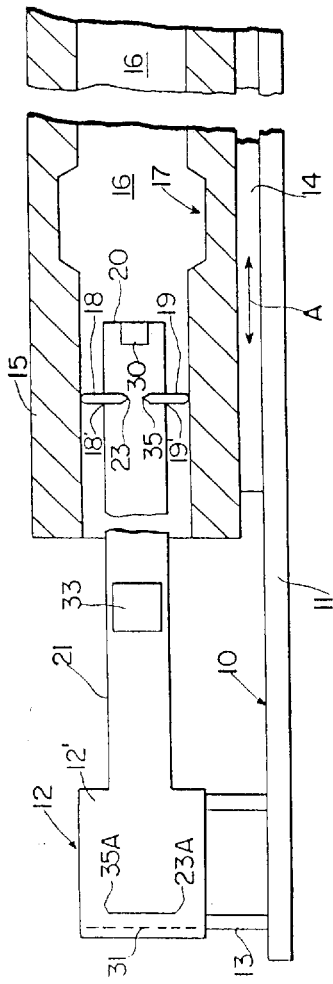
FIG. 1 is a diagrammatic side elevation view, partly in section, of a first embodiment of the invention.

With reference to FIG. 1, apparatus according to the invention includes a support structure 10 including a stable base 11, a housing 12, legs 13 for securing housing 12 to base 10 and a slide member 14 movable horizontally in the direction of arrow A in a track (not shown) in base 11. Slide 14 is used to position an object 15, in this case a tubular member having a bore 16. Bore 16 has a nominal constant diameter except for groove 17 provided at a point along the bore wall, the bore wall surface at groove 17 having an increased diameter. Object 15 is secured to slide member 14 in any convenient manner such as by screws or clamps (not shown) and is preferably releasably secured thereto.

Figure 2:
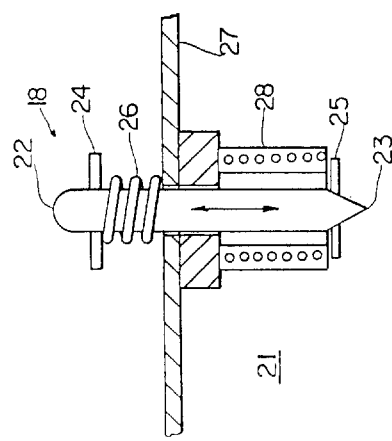
FIG. 2 is a diagrammatic side elevation view, partially in section, of a portion of a second embodiment of the invention.

Two gage members 18, 19 are mounted on housing 12 and are movable through apertures 18' and 19' at the distal end 20 of an elongate tube 21 forming a part of housing 12. As shown in FIG. 1, gage members 18, 19 are movable through apertures 18', 19' provided adjacent the distal end of probe tube 21. Each gage member is elongate and has a contact portion at its outer end for contacting the bore wall surface and a noncontact portion at its other end movable with the contact portion and comprising an edge. The edges of the two members are spaced apart forming a gap therebetween. As shown in FIG. 2, the gage members are conveniently cylindrical with one end 22 rounded for contacting the surface of a positioned object and the other end 23 provided with an edge which may be integral or a separate member, such as a knife edge, attached to the other end of the cylindrical gage member.

As shown in FIG. 2, (in which only gage member 18 is shown) each gage member is elongate and bears a flange 24 adjacent its rounded contact end and a flange 25 adjacent its edge end. At least one of flanges 24, 25 is removable to facilitate assembly. A spring 26 urges gage member 18 outwardly of tube 21 into a contact position in which contact portion 22 is in contact with a surface of a positioned object. Flange 25 acts as a stop to limit the outward motion of a gage member 18. Gage member 18 thus has an operable length, in the depicted embodiment, approximately equal to the distance between outer wall 27 (FIG. 2) of tube 21 and flange 24. Spring 26 is chosen so as to urge gage member 18 against the surface of a positioned object. A solenoid coil 28 surrounds gage member 18 and is provided with electrical energizing means not shown. Gage member 18 is magnetic, or bears a magnetic element, adjacent coil 28 and the magnet is arranged such that on energizing coil 28, gage member 18 is drawn inwardly into tube 21 to a withdrawn position in which contact portion 22 is out of contact with the surface of a positioned object with which it was previously in contact. Flange 24 limits the inward motion of gage member 18.

Gage members 18, 19 are sized such that, in use, a gap is formed therebetween. When gage member 18 is moved into its contact position, the gap formed between the edge of member 18 and the further edge is dependent upon the distance between the contact portion of the gage member and a reference point on the object. Thus, the gap provides a measure of the dimension between the contacted surface and a reference point on the object. In the embodiment of FIGS. 1 and 2, the reference point is a point on the bore wall diametrically opposite to the point where gage member 18 contacts the bore wall. The reference point is thus the contact point of gage member 19. The gap formed between the edges of members 18, 19 is thus proportional to the diameter of the bore. A bearing is provided to facilitate movement of pin 18 radially through tube wall 27. The gage members are thus mounted in housing 12 for diametrically opposite movement between the contact and withdrawn positions.

Referring again to FIG. 1, a light source 30 is mounted at the distal end 20 of tube 21 and positioned to direct light onto the edges of members 18 and 19. Light detector means comprising a plurality of light sensitive elements 31 are provided in an enlarged portion of housing 12. A lens 33 is also mounted in housing 12 to focus an image of the edges of gage members 18 and 19 onto the light detectors 31, the image being formed by the light from light source 30. A suitable light source is a light emitting diode such as an infra-red LED (RCA 56 1009). A suitable lens is a camera lens such as Canon 50 mm f 1.8, and a suitable light detector is a linear photodiode array commercially available as RL 1728 H.

In an alternative arrangement, object 15 is mounted in fixed position on a support member 14 which is in turn fixed to base 11. Housing 12, or at least probe 21 thereof, is mounted for movement relative to bore 16. For example, legs 13 could be mounted in tracks (not shown) extending lengthwise of base 11.

In addition to the solenoid actuated retract and engage system of FIG. 2, there are several other actuation schemes that also can be utilized—air, vacuum, levers, cams, etc. All of these are relatively well known per se and it is noted that all of them can be applied to this invention easily because of the fact that none of the means for transduction are located anywhere near the points being moved. This means for example that high electrical current solenoids can be used to move the pins without signal disturbance as in conventional LVDTs.

While the embodiment of FIGS. 1 and 2 above is shown using pin retractors which provide for reduced wear on the pin ends, the invention does not require positive retraction of the pins. For example, the pins can be moved inwardly by their movement into the part due to the linear motion of probe 21 as it goes into the bore. This is readily done by tapering the ends of the pins so as to provide an easy entry into the bore. Naturally, however, the taper angle cannot be too steep or the pin will tend to hang up and therefore, for large variations or for interruptions in the bore, retractors are desirable.

It is further noted that the gage members shown do not need to be in contact with the surface except for the brief instant required to take the reading with a high speed diode array scan. This means that the retractors can be utilized even though the probe is spinning without fear of substantial binding and shear wear on the probe tips. It is only necessary to read the diode array at the point at which the probe deceleration reaches zero as it is driven in against the bore wall, for example in the example of FIG. 1. Thus it is entirely within the invention to rotate the probe and diode array combination of FIG. 1 while the measurement is taken by simply firing the pins out, say every 30°, to obtain cylindricity data.

Particularly apropos for a multiple pin retractor system is the use of air or vacuum to force. All the pins out against the wall of a bore, for example, by pressurizing the total probe chamber. This means that the total probe is sealed off and everything is pressurized therein.

It is noted that the LED light source 30 shown in FIG. 1 could be located remotely and conveyed to the position shown in the figure using a fiber optic light guide. Indeed any sort of light source could be conveyed with the fiber optic, and these concepts are discussed below relative to FIGS. 9, 10 and 11. It is further noted that the light source is not at all limited to LED's, although they are attractive from their small packaging and long life point of view. Tungsten bulbs, diode lasers, gas lasers and every sort of light source will function in this invention.

It is noted that the position of edge 23 of member 18 and edge 35 of member 19 can be monitored independently since the image points 23A and 35A can be individually sensed on the photo diode array 31. This feature allows one to look for not only diameters (essentially the combined reading of image 23A point and 35A) but also for radial data such as roundness, etc. from either of the two edges independently. Of course, one can make a radial probe only or an axial probe only by simply eliminating one of the members such as 19.

Note that in FIG. 1 the edge points 35A and 23A are shown inverted from those of 18 and 19 because of the inversion due to the lens 33. Naturally, in other lens systems combining two lenses for example, the images could be righted.

It is further noted that the two edges themselves to not necessarily have to be those of opposite pins touching the bore wall to achieve this. For example, if one were to eliminate pin 19, one would clearly then have only the image 23A on the photo diode array 31 and one would be measuring the position of edge point 23 and therefore the end of the pin 22 against the bore wall. This measurement would be relative to the optical axis of the lens system which, therefore, forms the line on which cylindricity data of the bore is referenced. In many applications, however, it might be desirable to have a local reference for the pin location reference to the probe axis rather than the lens axis, although these are usually one and the same. In this case, an opposite edge point such as that of member 40 shown in FIG. 2 attached to the probe wall 21A can provide such a local reference, and this allows the measurement to be made even though the bore probe itself might deflect relative to the optical axis. Under normal cases, such deflection would not be desirable. However, the feature just described does not provide a means for allowing a flexible bore probe to be made which would follow a curved bore and still provide accurate data. In that case, for example, an additional probe contact 41 could be fixed to the outside of the probe wall 21A and contact 41 would then follow the bore surface 15 as shown. In this way the whole probe itself is referenced on one side to the bore wall while the sensed point 22 follows the contour of the opposite side.

It is noted that this invention can not only be used for round bores but also for bores such as those in microwave guides and other channels, etc.

It is also noted that the separation of the image points 35A and 23A depends not only on the spacing between the points 23 and 35 of members 18 and 19, but also on the magnification of the lens system 33. Clearly, the more magnification, the more resolution one might expect from the system if suitable circuitry is available to find the edge of the image as the slope of the image degrades, in other words, as it becomes less and less clear at which point the edge lies. In most applications, the magnification of anywhere from one to 1:1 to 20:1 is utilized with the area 5:1 to 12:1 being approximately the optimum case for most applications.

In addition to the optical magnification, electronic magnification of the diode array signal can be used to improve the resolution of the system beyond the simple number of elements in the array times the magnification. Such a circuit has been disclosed in my copending application Ser. No. 269,614, filed Jun. 2, 1981, which is a continuation of Ser. No. 073,226, filed Sep. 7, 1979, the disclosure of which is hereby incorporated by reference.

The examples above have functioned by monitoring the position of a single edge of the gage member in contact with the part, and this is the most common case. However, the invention goes considerably beyond this in that sets of multiple edges can be utilized to extend the range and/or improve the resolution of the system. An embodiment incorporating this, together with a unique arrangement of the diode arrays and pins, is shown in FIGS. 3A and 3B.

As shown therein a problem rises when it is decided to contour the inner diameter of a roller bearing cup 119 (i.e. outer raceway). This is a famous measurement problem to which no sensor to date has ever been known that could measure the diameters at all points along the tapered surface. The reason for this is that one needs both a range of 0.3 in. typically and a resolution of 10 millionths of an inch. This has been totally unavailable heretofore.

Figure 3B:
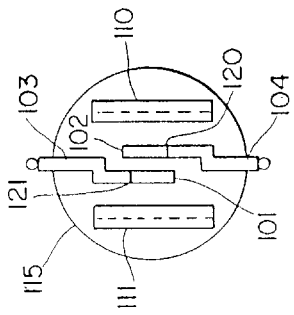
FIG. 3B is a diagrammatic end elevation view of a portion of the device of FIG. 3A.
Figure 3A:
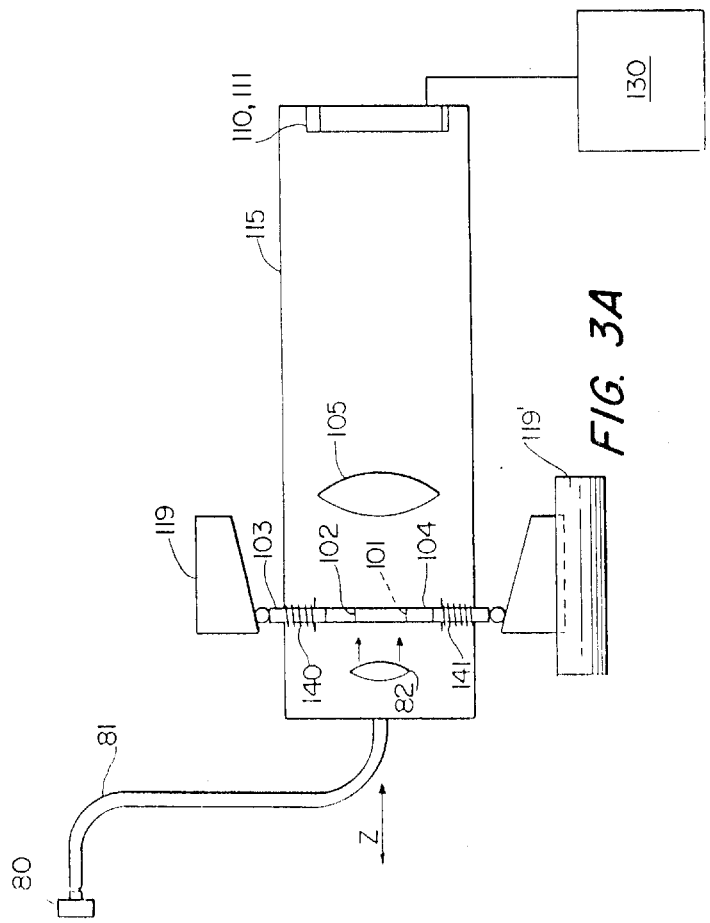
FIG. 3A is a diagrammatic side elevation view of a third embodiment of the invention.

FIGS. 3A and 3B also illustrate another feature of the invention insofar as it relates to analysis of cylindrical openings namely, the elongate probe tube is relatively rotatable with respect to the object. For example, as shown in FIG. 3A, the object may be rotated by a pair of driven rollers 119' on which cup bearing 119 is mounted.

In the arrangement shown, multiple edges are utilized, though it is noted that the invention can actually accomplish this measurement using a single edge as described relative to FIG. 1. First let us consider the operation in a single edge mode. In this case, the light from a remotely located light emitting diode 80 passes through fiber 81 and is collimated by lens 82, illuminating both edges 101 and 102 of the contact pins 103 and 104 which in this case are made to stagger one above the other. This stagger allows them to clear each other as they move in and out. The stagger also makes better use of the LED and/or fiber optic light field, which is actually circular, because the zone over their travel is illuminated. It further makes best use of lens 105 which images the edges onto diode arrays 110 and 111 which are also staggered in like manner but, of course, spaced farther apart due to the lens magnification. As shown, due to the lens inversion, the image edge 101 is sensed by array 110 and edge 102 by array 111. Cylindrical housing 115 supports the above items.

In this example, each array is used to track the position of one of the edges and the difference of the edge positions gives the diameter. Each edge individually can be monitored to give the concentricity data relative to the centerline of the movement of the probe in and out of the bearing cup 119 in the z (axial) direction.

Figure 4A:
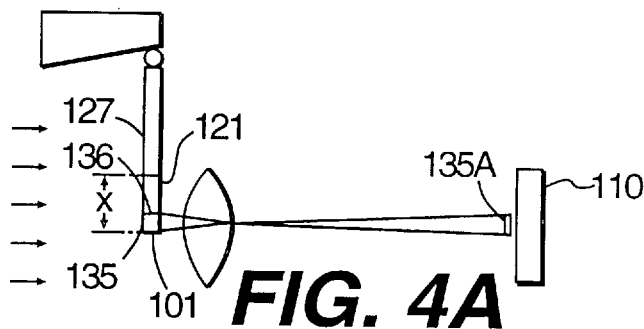
FIGS. 4A and 4B are diagrammatic side elevation views showing a multiple edge gage member in accordance with the present invention.
Figure 4B:
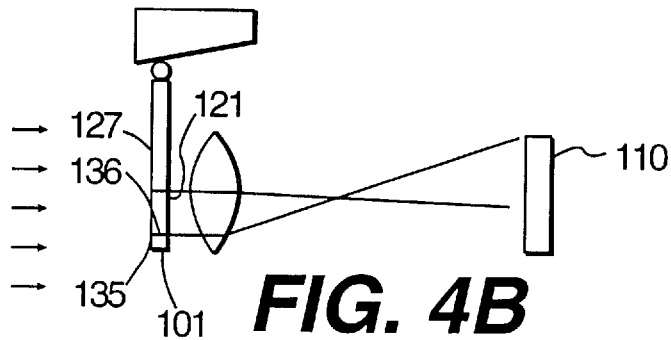

Now let us consider, as illustrated in FIGS. 4A and 4B, the use of an additional edge 121 spaced away from edge 101 and formed by vacuum deposition on a glass substrate 127. Since each pin position is monitored by an individual array, it is sufficient to consider the movement of one pin and edge.

If we now look at the operation, it is clear that as edge 101, for example, goes off the diode array 110 due to extension of the pin, the edge 121 will still be on the array. The microcomputer circuitry 130 recognizes this and adjusts to track edge 121 instead of edge 101 when edge 101 is a preset distance from the end of the array. Measurement accuracy is maintained since the degree of offset, i.e. the spacing between edges 101 and 121, is precalibrated, and can in any case be determined when both edges are on the array.

It is noted that with appropriate logic, an absolute measurement system is provided since the width of the strip 135 having edges 101 and 136 is obviously different from the solid area behind edge 121 and can be recognized. Similarly, range can be still further extended in absolute fashion using multiple edge strips, such as strip 135 with image 135A, each of which has a different width of the strip or spacing between each set, such as "x" between edges 101 and 121 is within the length of the diode array considering the lens magnification.

It is noted that this range extension comes without having to have a large light field and that it is operating in an absolute manner totally unlike Moire grid types commonly used for incremental encoders. They are actually scanning the image of the multiple edges and deciphering the absolute position of the contact.

It has been noted that either the spacing or width of the strips may be coded as to provide an absolute measure of the location of the edge points. For example, a double strip of two lines of different spacing can be used to denote the beginning of the cycle presently in view. The diode array circuitry 110 only looks, for example, at the left hand edge in making the measurement, and uses the code signal in the microcomputer 130 to look up in a table to tell which edge set it is looking at.

Naturally, the whole scale system, including light field irregularities, lens magnification aberration, etc., can be calibrated to obtain the exact points at which these edge positions occur as a function of contact location on the part.

It is further noted that the use of multiple edge positions, each sensed by the array and of known absolute spacing, provides an additional increase in resolution of the array output circuitry. This is described further in connection with FIG. 12.

Another advantage of using the multiple line grid is that it improves resolution and/or range for any given size diode array, or allows a reduction in diode array cost or size. For example, if a system was comprised as in FIG. 4A, but only edge 101 were monitored, range would be 0.100" and resolution would be 0.0001" for lens magnification of 10× and a 0.001" element to element spacing of the array. Appropriate multiple threshold circuitry can extend this resolution and, in the absence of same, one can extend resolution by going to higher lens magnification of say 20:1 In the present context, this would cut range to 0.050". However, if a dual edge system is used (e.g. edges 121 and 101) the range is extended to 0.1". Similarly, a 5 edge system could provide 0.50" range, etc. Quite obviously, the circuitry to handle which edge is that circuitry which could probably function up to at least 50 edges (on a 1000 element array). Thus, range could be 2.5" at 20×. The more closely spaced the lines, the smaller the light field has to be—a desirable feature at high magnification.

Figure 3C:
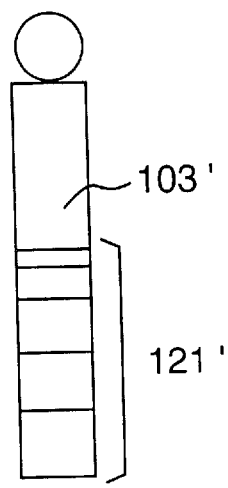
FIG. 3C is a diagrammatic side elevation and enlarged view of an alternative type of "edge" member useful in the invention and in the embodiment of FIGS. 3A and 3B.

As shown in FIG. 3C, pin 103, designated 103' in FIG. 3C, may be provided with a grating 121' in which the lines are spaced apart at progressively increasing intervals. In this embodiment, microprocessor 130 is provided with circuitry for detecting the magnitude of the spacing between the images of two adjacent lines of the grating.

It is further noted that the pins shown in FIGS. 3 and 4 are, in this case, spring loaded by springs 140 and 141 against the part with no retractor mechanism such as illustrated in FIG. 2. As the probe is moved in the z direction into the part bore, the ball contact slides into the bore due to its taper. Naturally the fully extended pin can be only slightly bigger than the part bore if such a lead-in is to be effective.

Figure 5:
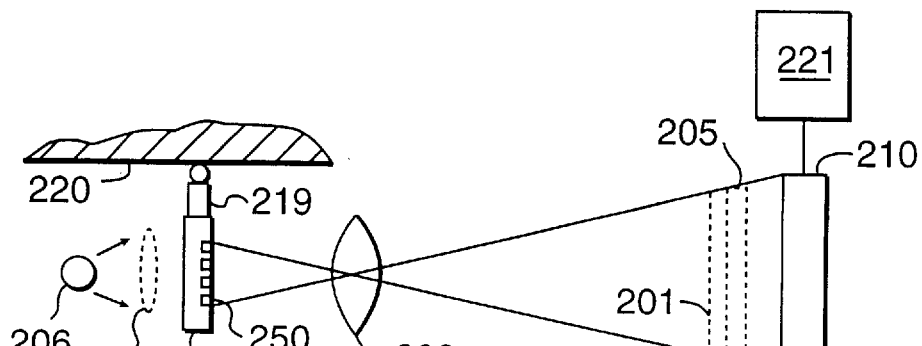
FIG. 5 is a diagrammatic view showing an alternative type of multiple edge gage member in accordance with the present invention.

Another multiple edge embodiment is shown in FIG. 5 which illustrates a vernier type system using grating 200. In this case the line widths and spacing of this grating are equal rather than unequal as shown in FIG. 5A, pin 219 designated 219' in FIG. 5A, may be provided with a grating 200' in which the lines are spaced apart at progressively increasing intervals. In this embodiment, the microprocessor is provided with circuitry for detecting the magnitude of the spacing between the images of two adjacent lines of the grating. Their image 201, provided by lens 208, is compared to another grating 205 such that the vernier effect is provided with the location of the correspondence between the lines occurring across the field at some location. Incandescent filament source 206 provides illumination which can be optionally collimated by lens 207.

It is noted in FIG. 5 that the dark lines of contact pin member grating 200 and reference grating 205 are not totally opaque. In this manner, the sensed signal on the photo diode array 210 only goes effectively to extinction when the lines of the grating image 201 coincide with those of grating 205. In this manner, the location of the vernier correspondence point can be sensed using a low level threshold trigger.

Two thresholds of electrical interrogation at a minimum are utilized. The first threshold is utilized to find the edge of grating 200 which is simply sensed by the diode array as a digital signal and utilized to track the rough movement of the grating and therefore pin 219 in contact with part surface 220. A second, low level, threshold is utilized to find the vernier correspondence point. This threshold is located very close to the zero light portion though not so close to be in the noise level of the array. It senses location where the two grating lines exactly coincide (within the system resolution). This alternatively can be characterized as the point where the two gratings "beat" together.

This particular approach offers considerable resolution enhancement. As discussed below, it is noted that the reference grating 205 can actually be created electronically and compared to the outputs of the diode array on a frequency or other basis. A consideration with any such vernier system, however, is that to work it requires the full width of the grating image to be on the diode array, with accordingly less range.

Let us consider the electronic vernier operation mode. Assuming grating 205 is removed, the frequency output of the diode array sensing grating image 201, plus the location of the first edge point 250 (which is the tracked fiducial mark) is fed into comparison circuitry 221 which could include a phase lock loop. The point at which the phase of the internally generated signal matches the signal from the array scan of the grating image is detected as the vernier location of the additional increment of position (beyond the rough resolution of point 250, detected by a strict diode array count basis).

In summation, therefore, if we consider in FIG. 3 that instead of a single point we would move a whole periodic grating image across the field of the diode array, (keeping all lines on the array) we would see that we would be able to achieve at least 10 times the resolution due to the vernier effect. However, because we were forced to use the whole length of the grating, our range would drip a factor of 10. Therefore, we would have to use, for any given measurement, 10 times the length of edges in order to see what we were doing. Therefore, to achieve the same range one would have to cut back the lens magnification which also cuts back the range and therefore yields an equivalent system. It should be noted, however, that there are certain cases where such vernier type can be effective: namely, in those cases where a lens magnification is not desirable as a means of achieving resolution and where little range but very high resolutions are required. Such high resolutions are possible as vernier magnification of 20:1 or better can be achieved with accurate phase comparison circuitry.

Figure 6:
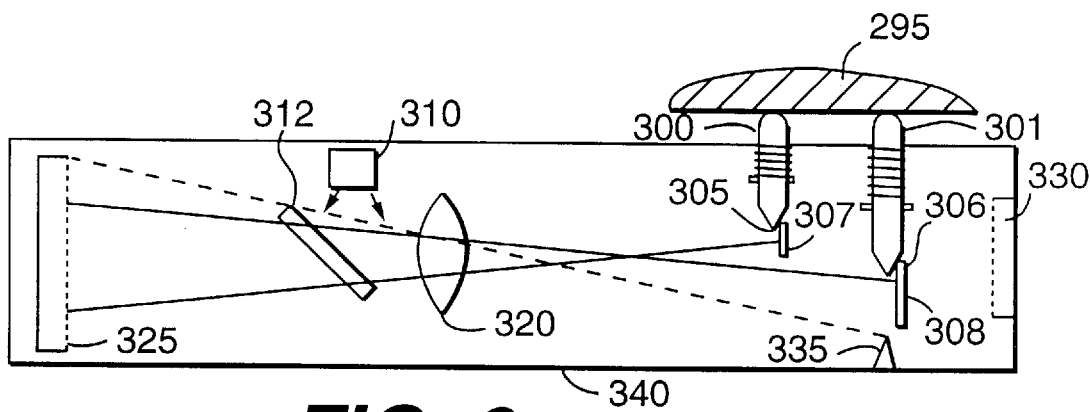
FIG. 6 is a diagrammatic side elevation view of a fourth embodiment of the invention.

The FIG. 6 illustrates another arrangement of the invention for measuring the relationship of points long a line of a part 295 simultaneously. In this case, pins 300 and 301 are arranged in the direction of the optical axis and to further illustrate another embodiment, each of the pin edges 305 and 306 has a tiny reflective mirror 307 and 308 on it. Thus it is the edge of the mirror that is measured and not the transmitted light. This is generally not as desirable but again often becomes a necessity when certain packing arrangements are to be made. In the illustrated case, for example, where it is desirable to have a light source 310 at the same end of the probe as the array 325 via beam splitter 312, lens 320 forms an image of each edge onto a single diode array 325. In this case, the range of diode array is used to look at all the pins together, however, it's obvious that each of the pins can only have a range much less than this if it is not to be masked by one or other of the probes. This is useful when one of the probes must be considerably different length than the other, or where the measurement must be taken simultaneously. It is noted that in a similar situation, a mirror 330 (shown in dotted lines) can also be put behind both pins. With such an arrangement the pins would have to have slots cut into them for the light to come through from behind and hit the next pin edge in succession, which is a little more cumbersome. To illustrate another point, note that array 325 can also be used to monitor the position of reference edge 335 fixed to probe body 340. This allows the position measurement of pin 301 to be locally compared, rather than using the optical axis for reference.

Figure 7:
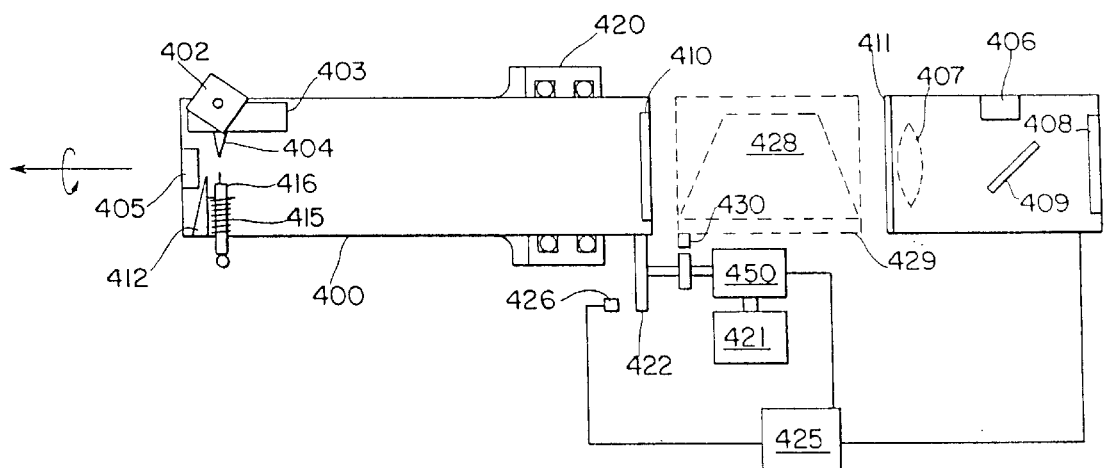
FIG. 7 is a diagrammatic side elevation view of a boring tool incorporating a monitoring means in accordance with the present invention.

The FIG. 7 illustrates the application of this invention to measurements taken in a similar manner to the embodiments above but on actual cutting tools. For example, consider a boring tool comprised of a boring bar 400 mounted in bearings 420 and having a cutter insert 402 in a holder 403 having a rear edge 404, and a mirror 405. In this particular example, this boring bar 400 h as been instrumented through windows 410 and 411 according to the invention using a remote light source 406, a lens 407, a beam splitter 409 and a diode array 408, so as to monitor the rear edge of the cutter relative to the optical axis or through the use of local edge reference 412 to the end of the boring bar. Such monitoring allows one to pick up the cutter position in space as well as deflection of the bar itself relative to the optical axis fixed onto the machine.

An optional pin 416 can also b e put on to allow the measurement of radius independent of the cutter for checking a bore during the actual cutting process. The pin can also be seen in the same diode array lens magnification along the lines shown above.

Similarly, a pair of integral opposing pins can determine diameter as discussed previously. Alternatively, they can be located orthogonally at 90° in the circumferential direction and a separate diode array utilized but with the same lens and light source system.

The cutter bar in this case can be used in a turning operation where it is stationary, but it is of interest now to consider monitoring during rotation used in boring.

One of the advantages of this arrangement is that the cutter can be rotated in its bearings 420 under power of motor 421 driving through gear 422 but the measurement can be made with no physical connection between the sensing portion represented by the lens, array, light source, etc. and the rotating portion. This is not possible with other systems that measure such displacements, etc. using electronics or air.

This advantage brings the chance to monitor the cutter while it is rotating by picking off the point at which the array is in position and firing the diode array. Thus, for example, in the version shown, the diode array readout control unit 425 picks off via sensor 425 a control pulse from the gear 422 and fires the reading at the point at which the edges are lined up such that the image falls on the diode array.

This firing of the data can be done by either pulsing light source 406 with a very short pulse or by simply restrobing the readout of the diode array. The short pulse technique is preferred to "freeze" the motion if very high rotational speeds are utilized.

One of the other features of the gage is to monitor the position of the cutter or the bore diameter throughout the total 360° cycle not only in this particular embodiment, but in other embodiments that might be used to simply gage bores for cylindricity for example In this case an example is shown in which a dove prism 428 in housing 429 is driven by gear reducer 430 at half the rotational speed of the cutter such that the image of the cutter edge appears stationary on the diode array even though it is rotating throughout is 360°. Alternatively, a similar mirror arrangement to the dove prism can also be used to accomplish this image derogation. It is also possible to approximate a full 360° monitoring by having a diode array 408 comprised of radial lines of detector elements at circumferential increments, i.e. every 5°.

While the examples above have all shown the use of imaging type optics to form an image of the cutter edge or the like on the diode array, it is noted that diffraction operating systems such as mentioned in many of my previous patents can be also utilized advantageously. These diffraction systems are described in my earlier U.S. Pat. Nos. 3,797,939: 3,840,301; 3,843,261; 3,883,249: 3,884,581: 3,994,584: 4,009,965: 4,131,365; and 4,168,911: the disclosures of which are herein incorporated by reference. For example, in the system shown in FIG. 7, if the lens 407 were removed the system would operate in the diffraction mode. In this case of course the light source 406 would be assumed to be a collimated diode laser for example and the diode array would be looking at the diffraction fringes produced by diffraction waves from the edge of the cutter member 404 and some other edge such as the opposite edge reference 412 or the edge 416 of the pin 415. In the diffraction case two edges are required to produce the pattern.

It is also of interest to note that being able to monitor the cutter position 360° through rotation allows the control unit 425 to sense the onset of chatter by detecting the minute high frequency movements of the cutter and therefore slow the rotational speed or the inward feed rate in the z direction such that the chatter is eliminated. By suitable finesse the control system can also control the cutter coolant flow and look for problems encountered due to poor metal conditions in the bore etc. This is particularly true if the control is also linked into a torque sensor such as 450 in the drive train from the motor 421.

It is also a part of this invent ion to provide useful means to monitor the edge of the cutter even if it is spinning as it is withdrawn from the part. This is done in order to achieve a calibration as to where the cutter is and the amount of tool damage. Tool wear is also determined using the invention to determine both the rear position and the front position of the cutting point.

Figure 8:
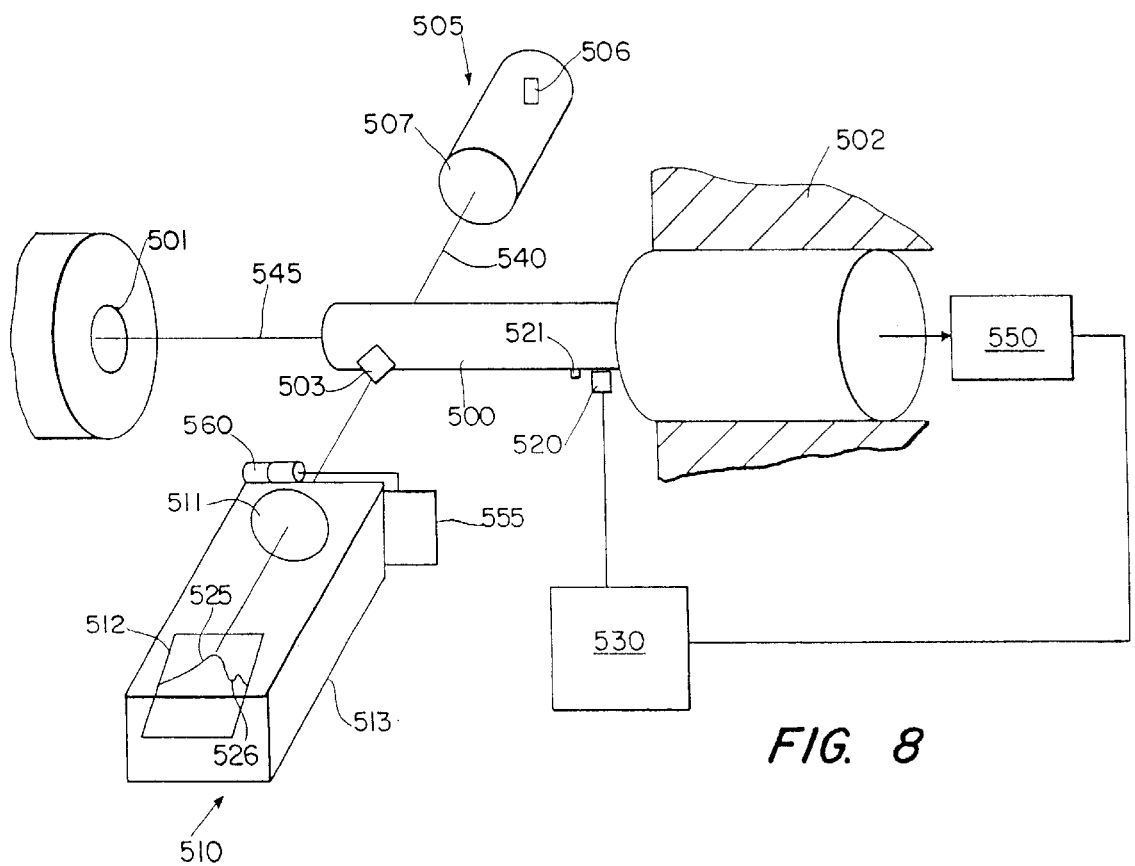
FIG. 8 is a diagrammatic perspective view of a boring tool incorporating a further monitoring device in accordance with the present invention.

As shown in FIG. 8, a square matrix photo diode array sensor 512 is used to find the exact edge of the cutter even though it is spinning by using a flashed light source 505 to freeze the position of the cutter at the correct time in the rotational cycle.

In this example, boring bar 500, rotating on bearings not shown, is withdrawn from work piece 501 by slide 502, a portion of which is shown. When the boring bar having insertable cutter 503 is returned to its home position, it comes within the range of the sensing equipment comprising a flashed light source 505 which in this case comprises a pulsed LED 506 and a lens 507, and a sensor unit 510 comprised of lens 511 and matrix photo diode array 512 all housed in housing 513.

At the correct point, a pulse is taken from the rotating bar by sensor 520 sensing flag 521 on the bar and this causes the strobed light 505 to fire when the cutter is in the bottom dead center position. At this point, the image 525 of the cutter is formed on the diode array. Next, the control unit incorporating microcomputer 530 causes the: diode array to be scanned out to find the high point of the cutter, which in this case is the cutting edge, and its dimension from the reference axis 540 of the sensor light source unit. This reference is locked to the base of the machine containing slide 502 and the rotation means and is assumed to fix the point at which the cutter is positioned relative to the center line 545 of the boring bar which also has its center of rotation.

At this point, the comparison is made between the cutter position sensed and that which is correct for the work to be bored. If there is any deviation, a control signal is sent to the spindle compensating module 550 which can be one of any number of brands on the market which feeds a compensation signal moving the cutting or the whole boring bar into position such that the cutter tip is now in correct location. After the compensation is performed, the inspection cycle is again performed and the position verified. It can well be that this new position is actually verified relative to a diameter check made at an inspection station downstream.

This particular embodiment of the invention provides a very great step forward in such compensation schemes because, in general, there is no way to tell at the point of compensation whether the spindle compensating mechanical action has been correctly applied. This is solved by the invention which "closes the loop" on such control systems, besides providing additional information as to wear, damage, etc. (For example nick 526 of cutter detected on image 525).

It is noted that the invention can be used with single point tools such as that shown, or multiple point cutters in which the cutting edges of each are sensed during one revolution (using multiple sync pulses from multiple flags 521). In addition, the same basic approach works on boring bars such as engine cam boring bars which have multiple cutters in an axial row (2 axis) but are generally not rotating on retraction. In this case a circumferential timing pulse from sensor 520 is not required but each is monitored in turn as the bar is axially retracted. In the cases where very large radial range is required (typically 0.080") because of the different cutter heights, a linear array can be used in place of matrix 512 as the 2 axis scan, motion is already provided by the retraction of the bar itself.

The invention as shown can also measure the form of the cutting edge and detect chipped-out sections and other deformities, and then signal for a tool change as needed. This is particularly of interest with ceramics, etc. Also of interest is that the invention as shown here can be used to set up the cutters in the first place, either on or off the machine. In this case the operator simply adjusts insert height until the detected array signal is at the desired location (usually set into the controller).

The environment around the sensor is commonly filled with coolant and chips, although it is noted that the coolant can be turned off at the retraction point so as to minimize the amount of direct spray. It is, therefore, often desirable to have a shutter 555 such as that shown actuated by air cylinder 560 connected to the control unit. Because of the rapid measurement using a flash which effectively freezes the position of the cutter within a few microseconds or less at even a several thousand RPM rotational rate, this shutter need stay open only a few milliseconds at most. Thus there is very little chance for contamination to get onto the lenses. It is noted that a shutter would be desired for the flash source unit 505 as well. Besides shutter 555, air blowoffs or other cleaning means can be used in conjunction, and it is particularly desirable to pressurize the area between the lens and the shutter such that when the shutter opens the outward surge of air from that area precludes anything from coming in. This has worked out effectively in practice.

One of the more interesting aspects of the invention is to look at the rear edge of something related to the cutter as in FIG. 7 while the cutter is rotating rather than just at one position as in the embodiment of FIG. 7. This can be done in a variety of ways. The first way is simply to use a multiplicity of diode arrays, radially disposed around an axis. This then would look just like the drawing of FIG. 7 but with diode arrays coming up radially from the paper every 10 degrees for example to form an approximation of a total circular monitoring system. For this to be effective, it requires in effect a pie shaped diode array unit with radial lines of elements. This can be obtained only on a special basis at the present time making it very expensive, although this may not be the case in the future. Certain types of television camera tubes can operate with radial scans, circumferentially rotated, but they are not well suited to plant applications.

Another possibility is to simply rotate the diode array unit with the boring tool. Obviously, however, this gets to be very difficult if the tool is in continuous 360° motion since it implies the use of slip rings, etc. which are costly and prone to so many noise problems that it is not considered to be a satisfactory solution.

Figure 9:
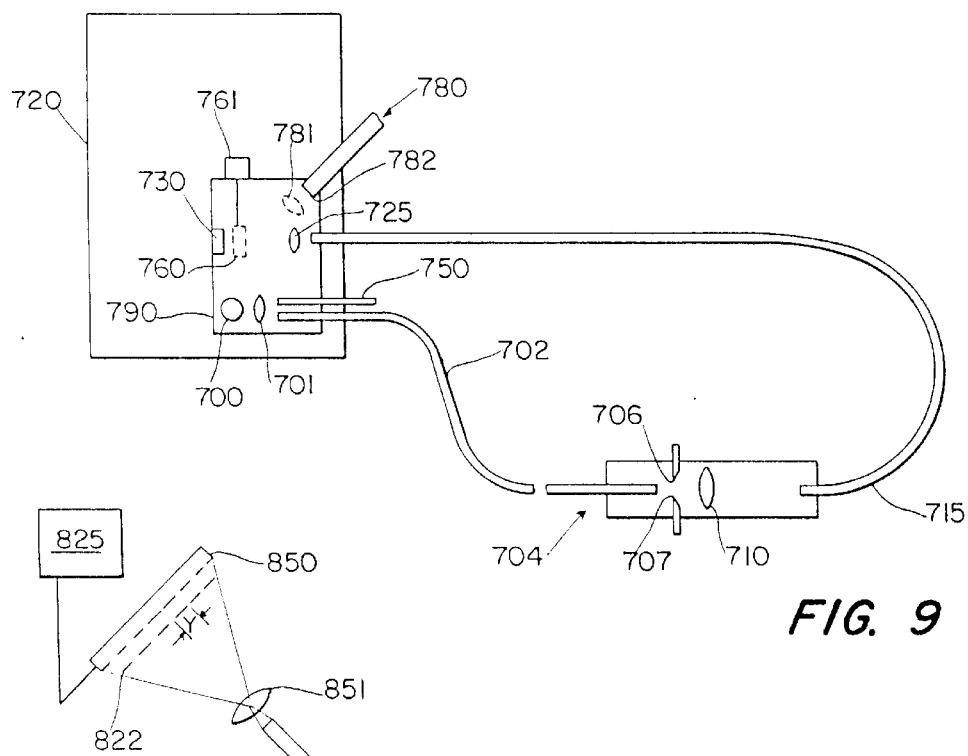
FIG. 9 is a diagrammatic side elevation view of a fifth embodiment of the invention.

The embodiments above have briefly described the use of fiber optics to provide a remote illumination source. FIG. 9 illustrates another embodiment of the invention utilizing fiber optic transmission with a light source and/or readout system remote from the actual measuring area. Use of such fiber techniques provides an easily mounted package in the measurement zone which can have great advantages in certain closely packed checking applications where multiple dimensions are to be checked within a small volume.

Another advantage of fiber optics in this application is that a centralized control unit can be built, servicing multiple heads with nothing else at each individual probe but the simple contact mechanisms and perhaps the light source or detector if one of these two are not remote. This allows for ease of service and allows for the time-sharing (so to speak) of a single lamp and detector unit amongst multiple sensor heads, potentially cutting the cost of the total package. This cost factor is true only if the cost of the fibers is less than the cost of actually utilizing individual sources or detectors. This may or may not be the case at this time but all trends are in this direction.

Let us now consider FIG. 9. This illustrates a system in which both the light source unit and the sensing unit are indeed remote. In the case shown, a Xenon flash lamp 700 is focussed by lens 701 down into the fiber 702 going to the gage probe 704. This fiber optic illuminates the pin edges 706 and 707 from the rear, and a lens 710 in the. probe images the light from the edges onto a second fiber optic 715 which brings the image back to the central control box 720.

It is of considerable interest to consider that the fiber bringing the light back must, of course, maintain the resolution of the edges if an accurate measurement is to be made. There are two types of fibers that can be used for this. The most common heretofore has been the use of coherent bundles of fibers and these can certainly be used here. In this case, the end of the bundle at the receiving end must be imaged for example with lens 725 onto a suitable image position detector, such as photodiode array 730.

The coherent bundles, however, are bulky, expensive and have considerable light losses due to the fiber designs and the fact that there are intersticial gaps between the fibers. They also have limited resolution because of these gaps.

Accordingly it is thought that the most desirable fiber in the long run is the guided wave single fiber rather than a bundle of individual clad multi-mode fibers. The guided wave fiber such as the selfoc type is presently only available in short lengths suitable for use with laser type sources which of course can be used in this case. Eventually, however, these will be available in white light form and capable of transmitting images with very high resolution at low cost. In this case, the lens 710 and the lens 725 are actually chosen to couple the images into and out of the fiber in such a manner as to transmit them onto detector array 730. In this case of course a single fiber rather than a bundle is used and it is noted that the position of both lenses 710 and 725 would not be the same as that in which one was trying to focus the edge images onto the end of fiber 715 and to image the other end of the fiber using lens 725 onto the array. Other than that the schematic diagram would be the same with the graded index type fibers as well as the bundles.

This same technique can be utilized with diffraction based sensing as well and the next drawing illustrates this case utilizing another type of sensor. Before proceeding, however, it is of interest to note that the system as shown in FIG. 9 can be used to monitor more than one sensor probe. For example, the light source 700 could feed a second sensor probe simply over fiber 750 for example. It is also entirely possible, for example, by using a square matrix photo diode array, to monitor the ends of fibers (not shown) from additional sensor probes using the same imaging lens 725.

Other ways of time sharing the multiple fibers from additional sensors extending out of the plane of the paper could be used much as single linear array 730 is used. In such a design, an oscillating mirror 760 driven by motor 761 could sweep the various images from the fibers past the linear diode arrays making it act in effect like a matrix array of multiple columns.

Another possible way is to simply bring the fibers such as 780 in from different angles using a separate lens such as 781 to form in onto the diode array which itself would be decomposed slightly because of the angle of incidence but could still quite easily measure either the image produced or the fringes. In the case of an image, it would be desirable to cant the end of the fiber so that the edge would remain in focus on the array given the tilt angle. This end of the array is noted as 782.

It is of further use to consider that all of these elements can be located within a self contained box with a readout and that this is one of the big advantages of utilizing the fiber since this box such as box 790 can be the opto-mechanical structure and can be very rigid. It also saves money on the other portions by providing a total package concept usable with a wide number of different sensor heads, etc. It is noted that once one goes to a fiber based system, the readout module such as box 790 becomes usable for any sort of transducer whose light can be carried over fibers. And this includes triangulating sensors, imaginary sensors and so forth.

Figure 10:
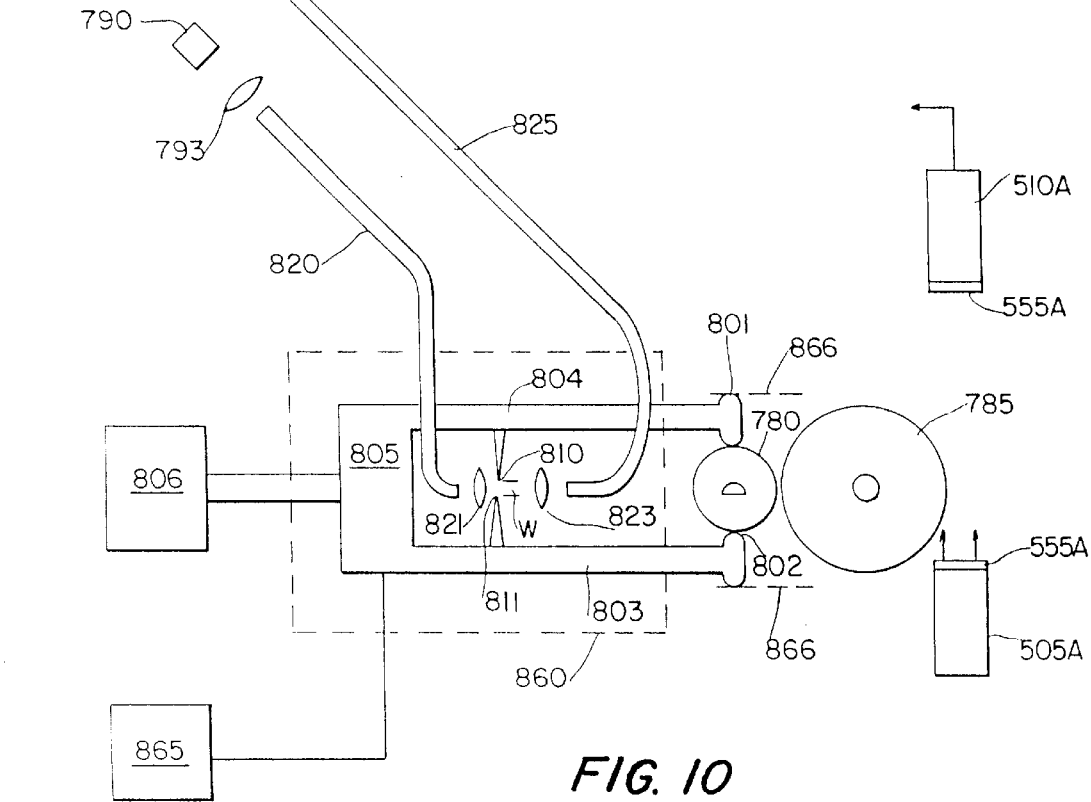
FIG. 10 is a diagrammatic side elevation view of a sixth embodiment of the invention.

FIG. 10 illustrates the use of the fiber system with a diode laser light source 790 feeding through a single wave guide fiber so as to preserve its coherence to a sensor utilized to measure the outer diameter of a wrist pin 780 on a grinder while the grinding wheel 785 is in operation. The contacts 801 and 802 are contacting the outer edge of the wrist pin 780. Arms 804 and 803 are rigidly connected to base 805 and contain edges 810 and 811 which are illuminated with laser radiation emanating from the end of single mode wave guide fiber 820 (i.e. SEIIFOC) and collimated by lens 821. The resulting diffraction pattern 822 due to edges 810 and 811 is directed into returning fiber 825 by lens 823 and imaged onto diode array 850 by lens 851. Analysis of the diffraction pattern fringe spacing "y" by readout 852 gives edge spacing "w". and thence is proportioned to the diameter of the wrist pin.

It is noted that in the FIG. 10 discussion to this point, the contacts are assumed to ride on the part 780 due to the taper on the contacts and the movement of mechanism 806. However, it is also noted that the arms 803 and 804 might also be, for example, piezoelectric bimorph or similar elements controlled by a voltage source 865 which can retract or expand toward the part as a function of applied signal. Control of such motion at high speed allows inspection of interrupted diameters on the fly, for example.

It is further noted that the same arrangement can also be used to gage inside diameters, etc. such as represented by surface (dotted lines).

FIG. 10 also illustrates the in line monitoring of the grinding wheel position and/or form according to the invention, for the purpose of controlling the duration of grinding to achieve a given size and/or to determine if the wheel needs dressing. For this purpose, hardware equivalent to that of FIG. 8 is utilized, comprising light source 505A and sensor unit 510A having a linear or matrix photodiode array readout of wheel edge location. Signals are fed to a controller which then provides a signal to the wheel positioning control (not shown) to move it toward the part or away from the part for part change or wheel dressing.

It is further noted that these same machines control concepts that can be provided in other operations such as internal grind of bearing raceways and boring of cylinder bores, etc.

As in FIG. 8, a shutter and/or an air pressure unit 555A is provided to keep the windows clean during the process and during the relatively instantaneous period of the check.

It is noted that the concepts above have described the monitoring of cutter positioning for part size during or after machining It is, however, of interest to consider the use of built-in gage member probes 416 such as shown in FIG. 7 or probes 940 in FIG. 12 to check a part size before commencing machining. In the case of FIG. 7, the cutter (i.e. 402) would be retracted (for example by a draw bar not shown) and the probe enters a bore of unknown size. The readout of the built-in probe position is fed back to set the cutter at the proper position for the most economic first cut. The cutter position can be checked as to proper setting by the embodiment of FIG. 8.

FIG. 11 illustrates another version utilizing fiber based readout. In this case a bore probe or 'plug' 900 comprises four contact pins 901–904, each contacting a bore wall 905 at 90# increments. An LED light source 910 is used and lens 911 images the inner edges of the contact members onto coherent fiber bundle 912 with about 10× magnification.

At the other end of the bundle, the resulting transmitted image of inner edges of contact pins 901 and 903 are imaged by lens 915 onto photodiode array 916, and the edges of pins 902 and 904 are imaged via beam splitter 920 by lens 921 onto array 922. Analysis of outputs of array 922 and 916 gives the ovality and out of roundness of the bore 905, as well as the diameter in two planes. This is a very desirable result, in a very compact package.

It is noted that the result can also be achieved using diffraction readout and by replacing LED 910 with a diode laser or similar quasi coherent source. In this case, lens 911 is used to focus the pattern onto the fiber end and arrays 916 and 922 to interrogate the matter.

Now consider FIG. 12. This illustrates control of a turning operation in which a titanium work piece 929 is rotated at velocity by a motor and spindle 930, and turned to diameter D by cutter insert 931 on bar 932 attached to slide 933. Feed rate is controlled by a motor 934 and tool position by a motor 935 acting on inclined planes 936 via a screw mechanism not shown.

Pin 940 contacts the part surface and the rear edge(s) of the pin are illuminated by the LED sources 941 and the edge image(s) framed by lens 942 on diode array 943. Blown air or shield means to keep chips and coolant off pin 940 where necessary are not illustrated for clarity.

In this embodiment a microprocessor based controller (not shown) is used to monitor and control the tool position, feed and speed rates as a function of data obtained from pin 940 regarding the dimension of the part and changes therein (due to chatter, etc.) At this point it is of interest to discuss various circuits which can be used to determine image edge position of the contact members. The single edge per pin case is similar to that discussed in my copending U.S. application Ser. No. 269,614, the disclosure of which is hereby incorporated by reference is noted therein, a multiple threshold circuit can be used. This can yield up to 0× additional magnification—a very important point where high resolution is desired.

Of added interest is the use, shown in FIG. 12, of multiple edges to increase resolution. Obviously, if one tracks the image 949 of the edge 950 of the grid 951 only, the case is like that described above. However, the use of additional edges spaced a constant distance apart provides an additional degree of resolution without resorting to drift prone multiple analog thresholds or even vernier or phase comparison techniques. For example, if there are 20 bars in grating 951 on 0.002" centers, a 10:1 image produced by lens 951 occupies 0.400" on array 960 which is a one inch Reticon 1728H type having elements on 0.0006" centers. At 10:1, the pin 970 can move 0.060" and still keep all edges on the array.

Now, the payoff in this is the resolution of defining where the pin is. Normally in a single threshold system, it would be 10× the lens magnification) times the array spacing or 0.00006". However, in this case, the pin edge is taken to be the average of all 20 edges for really 40 as each side of a bar can be counted). If the period of the grid as imaged by the lens (i.e. a line space 80.002 becomes 0.020" on the array at 10×) is a prime number insofar as the array inter-element spacing is concerned, then in general the resolution of the average is improved 40 times even with a single array threshold voltage vo.

$$\text{Ave. Position} = \sum_{n=1}^{40} X_n/40 \quad \begin{array}{l}\text{where } X_n \text{ is the detector} \\ \text{array element number on} \\ \text{which an edge crosses the} \\ \text{threshold } V_o.\end{array}$$

This averaging procedure also tends to cancel out interelement sensitivity differences.

Finally it is noted that the embodiments above show a contact actually touching the surface to be measured. This contact condition can indeed be monitored using electric current flow or other suitable means. It is within the realm of the invention to determine size even if the member is not in contact but a known distance away. In other words, a compact air unit could be provided to indicate that a pin was not in contact by a certain amount.

In addition it is noted that accuracy improvements can be made by simply taking a plurality of readings of the same position and dividing the number. This eliminates random fluctuations.

Figure 13:
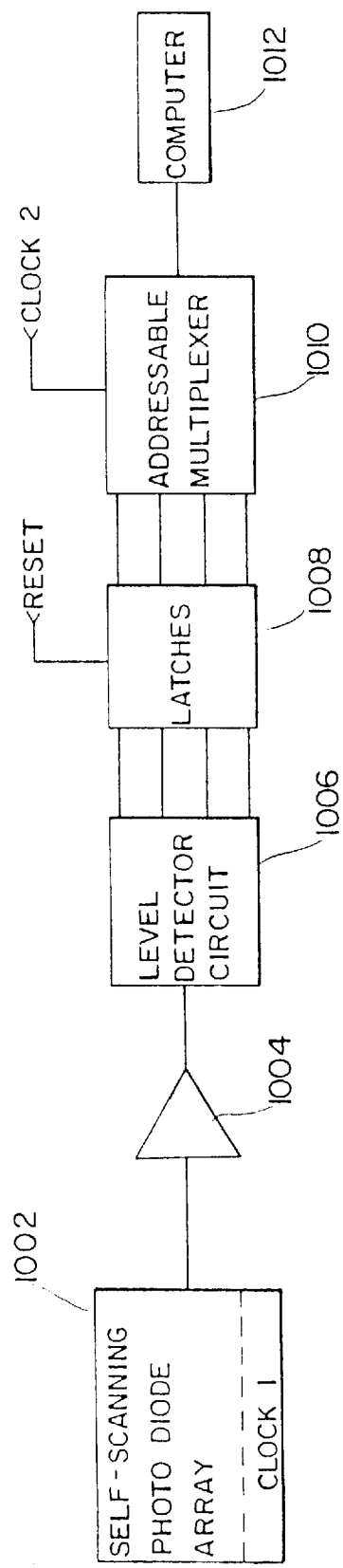
FIG. 13 is a schematic block diagram of one embodiment of an analyzing means in accordance with the present invention.

With reference to FIG. 13, an array output circuit is disclosed for analyzing the output signals from the light sensitive elements, such as photodiodes, of an array 1002. In conventional circuits, due to the limitation from the finite size of the light sensitive elements, the position of an edge of an image cannot be detected to a greater accuracy than one element. However, by using multiple threshold circuitry techniques with light sensitive elements that produce an analog video output that varies with the intensity of the incident illuminating, the position accuracy can be increased to a fraction of the spacing between adjacent elements. The particular fraction is determined by the number of thresholds used.

Photodiode array 1002 is a conventional, self-scanning array that has a predetermined number of photodiodes with a known spacing therebetween. Each photodiode is sequentially, individually scanned and produces an analog output signal such as a voltage. This video output signal is fed through a video buffer 1004 to a multiple level detector circuit 1006. Level detector circuit 1006 can be comprised of a plurality of conventional, differential, operational amplifiers (such as LM 301's) connected in parallel to the output of buffer 1004 through a chain of voltage dividing resistors set the respective level for the amplifiers.

The output signals from level detector circuit 1006 are binary signals equal in number to the desired number of thresholds. The output signals from level detector circuit 1006 are latched in corresponding latches 1008 (which can be conventional D-type flip-flops in IC 7474). Each latch is cyclically interrogated by an addressable multiplexer 1010 at a rate that is a multiple of the array clock equal to the number of thresholds. Multiplexer 1010 can be a conventional digital multiplexer (such as IC 74153) that is sequentially addressed by a binary counter (such as IC 7493) clocked at the multiple rate.

In the example depicted in FIG. 13, four thresholds are used. Thus, there are four outputs from level detector circuit 1006, four latches 1008, and four inputs to addressable multiplexer 1010. Also, the rate of clock 2, which clocks address able multiplexer 1010, is four times the rate of clock 1, which clocks array 1002.

The output from addressable multiplexer 1010 is a stream of pulses or a pulse train having a frequency that is the multiple of the number of thresholds times the array clock (a frequency of four times the array clock for the present example). The pulse train is fed to the input of a computer 1012. In one example, computer 1012 simply can be a conventional totalizing counter. In another example, computer 1012 can be a programmed calculator that continuously computes and displays the dimension being measured. In a further example, computer 1012 can determine the position of an edge projected onto array 1002 as being the half way point on the slope in the light-to-dark transition zone.

At the beginning of each scan, latches 1008 are reset or cleared. During the scan time, when the video signal reaches a particular threshold level, the corresponding latch 1008 is set. The continuously scanned multiplexer 1010 thus produces a count pulse for each latch that has been set high on each of the scan sequences.

Figure 14A:
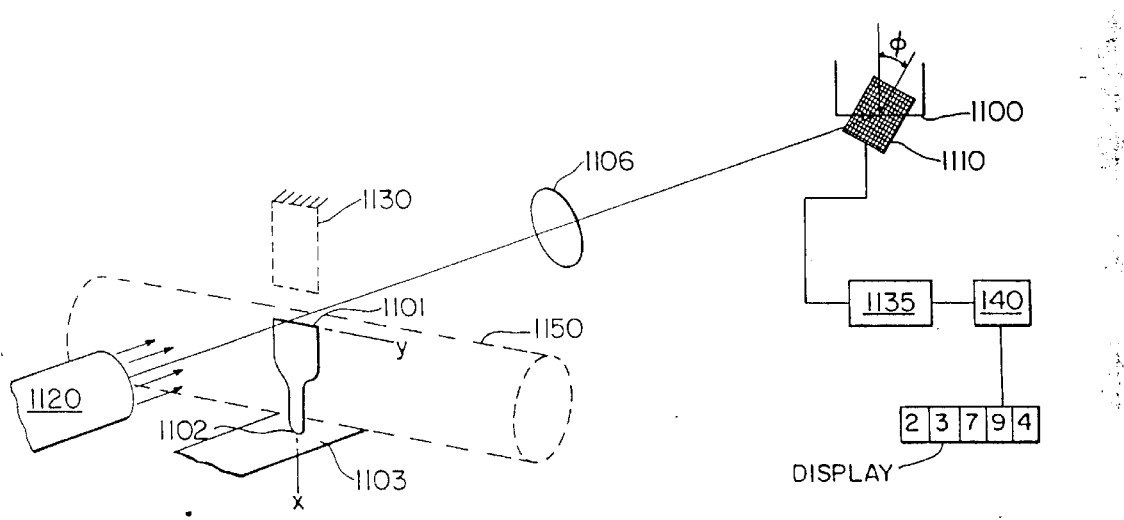
FIG. 14A is a diagrammatic perspective view of a further embodiment of the invention.
Figure 14B:
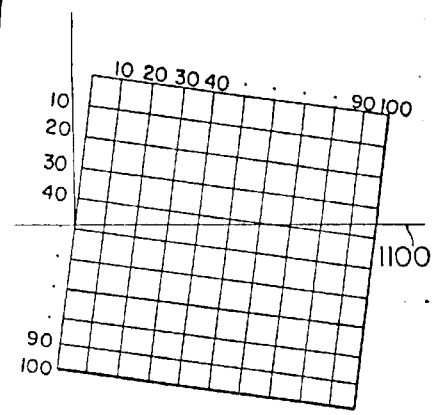
FIG. 14B is an elongate diagrammatic view of a portion of FIG. 14A.

Finally FIG. 14 illustrates use of a canted matrix array to improve resolution of edges utilized in this invention. As shown, the image 1100 of the edge 1101 on the opposite end of contact point 1102 contacting surface 1103, is imaged by lens 1106 onto matrix array 1110. In this application, however, light source 1120 is relatively broad and the edge image 1100 occupies a considerable extension in space along the axis of the edge itself (y axis). Note that the edge image extension in the y direction should be such that edge covers the total width of the array in the y direction at all times.

For edge image detection, this embodiment discloses use of a matrix diode array which is canted slightly relative to the edge image cant angle ø. This angle is kept very small at such that at a fixed threshold detector voltage value of $V_0$. The detected edge image moves down each line of the array, let us say line 1 through 128 on a 128 line array before it recirculates to trip the next detector in the first line. This creates a type of vernier for the array and vastly increases the resolution.

It is noted that either the array can be tilted relative to the direction of motion of the edge which is the more normal case or conversely the array can be positioned in the direction of edge motion and the edge 1101 itself tilted (direction of motion in x direction). Either approach gives the desired results namely that as the edge moves, the detectors in each row but of the same column number successively see the edge image cross their fixed threshold.

As shown in the figure, one mode of interrogating such a system is to count via counter 1135, the number of detectors which are 'dark' (i.e. below the threshold voltage $V_0$) in the matrix arrays This number is proportional to the value on all detectors at once in each column, for example a 100×100 element array has 10,000 detectors dark (ie. below $V_0$). If at a first edge position one row has 11 where all the other rows have 10 dark. The count total is 1001. If however the point moves just slightly into the light field, i.e. in the positive x (vertical) direction, then the detector count in each of the first two rows goes to 11 with 10 in the rest. This ups the count total to 1002.

The effective resolution improvement is 100×, and a simple divider circuit 140 provides 2 extra decimal places of resolution in the answer as shown.

It is noted that larger offset angles ø can be used if suitable is additional calculation provided. However ø=1/n where n is the number of elements in the array row is preferred.

Optionally, this same result can be obtained using a reference edge 1130 as shown in dotted lines. In one case the reference edge is either parallel to the array or canted at a different angle to the array. In addition both edges may move as in FIG. 1. In both cases two edge images are seen on the array.

This resolution improvement invent ion can be extended to sensing of images of parts. For example, let us consider that the edge image 1100 coming from edge 1101 is instead created by the image of a cylindrical object such as a roller bearing 1150 (shown in the dotted lines).

It is noted that in this embodiment also one may use diffraction patterns of the edges obtained if light source 1120 is a laser. The same resolution improvement results but additional circuitry is required to average the fringe count, since multiple fringes are usually on the array, not just one (which would be similar to an edge image). In this case each fringe undergoes such a resolution increase, and the count output is equal to the number obtained above times the number of fringes present.

To produce the diffraction fringes one would require two edges, for example reference 1130 and contact edge 1101, or the edge of part 1150.

Finally, it is again noted that in any of the embodiments described herein, that no physical connection need exist between the contacts forming the edges and the readout system. This has been discussed relative to rotation of the contact (FIG. 7) but also can be of interest relative to their linear translation along the optical axis separating the contact probe and the optical image or diffraction pattern sensing diode array.

For example, consider FIG. 1. Probe housing 21 might be limited to only the small zone around the contacts 18 and 19, and not physically connected to the readout section 12. To probe the bore of part 15, this section 21 could be moved in and out while readout 12 remains fixed.

In so doing, one must compensate, in the diffraction case for variation in edge to array readout distance R. The value for such compensation is immediately available from the bore probe position along the bore axis. In imaging systems the problem is that the edge definition changes due to depth of field changes and this must be compensated—a more difficult task.

The last embodiment of this invention shows another version of the tool inspection configuration shown in FIG. 8. The basic sensing unit such as sensor 513 with flash light source 505 are again utilized, this time however in order to inspect the condition and determine the location in space of a variety of interchangeable tools on a machining center.

Figure 15A:
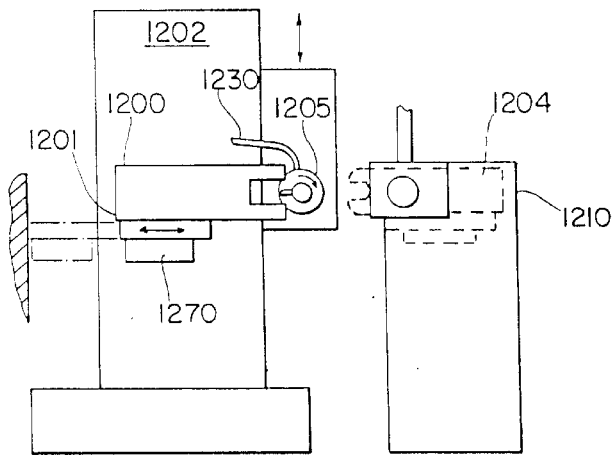
FIG. 15A is a diagrammatic side elevation view of a further embodiment of the invention.
Figure 15B:
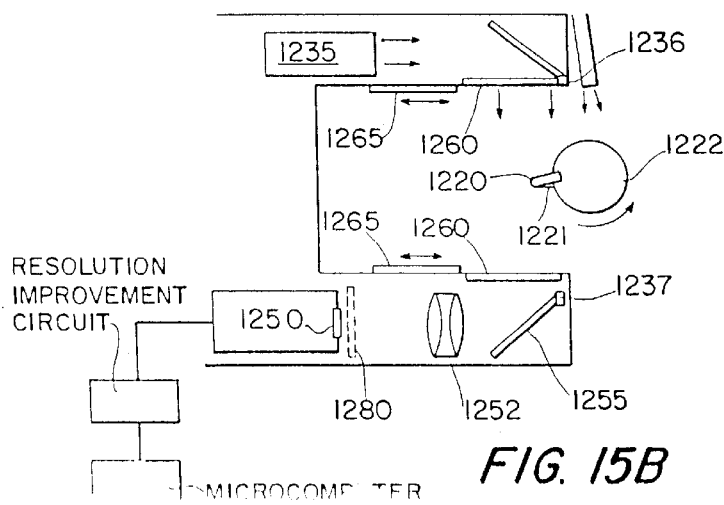
FIG. 15B is a diagrammatic side elevation view of a portion of FIG. 15A.
Figure 15C:
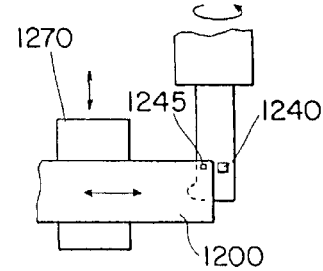
FIG. 15C is a diagrammatic top view of FIG. 15B.

Consider FIG. 15. This shows in block form a typical machining center such as a Kerney & Trecker Milwaulkee-Matic "Moduline" travelling table machine. This machine as is typical of many machining centers has a vertically moving spindle with a horizontally moving table. The whole column itself moves in and out in the z axis (out of the plane of the drawing).

Tool changer is often provided with these machines. The machine retracts back to the tool change location and an automatic arm interchanges the new tool with the tool just utilized which is put back into a magazine.

It is at this tool change location that perhaps the ideal chance for inspection occurs since the machine must go to this location at every tool change and therefore almost every operation. Because the machine axes are slow, e.g. 200 ipm max) it is desirable to provide high speed axis on the sensor head to move it into place at the tool change location in order to make the measurement. This provides the absolute minimum of disruption of machine cycle associated with the inspection. Since a typical inspection of a tool such as a drill, tap, reamer, boring bar, face mill etc. may take only a second or two, the actual disruption is in virtually all cases less than 5 seconds including the in/out time of the sensor unit to clear the tool change operation.

As shown, the sensor unit 1200 is moveable in and out on x axis slide 1201 attached to machine upright 1202 or alternatively the tool changer, etc. (e.g. location 1204 dotted lines). When the spindle 1205 is in the position for a tool change into magazine 1210, the x axis slide is activated bringing the sensor unit in so as to be in a position to illuminate the critical edges of the tool in question for example, edge zone 1220 of cutter insert 1221 in boring bar 1222.

At this particular location, when the optical sensor unit is in place an optional air line 1230 is utilized to blow off any chips or coolant etc. from the tool. This air line can be provided as shown on the sensor unit or it can be provided separately. Any coolant lines etc. flooding the tool are normally turned off during the measurement.

As shown in the diagram, the tool can be rotating or stationary during the time of measurement. If the tool is rotating it is highly desirable to utilize in most cases at least, flashed light source such as 1235. This flashed light source is cued by either a shaft encoder on the spindle knot shown for clarity) or a part position sensor such as tripped by using light source 1236 and detector 1237 in order to sense the portion of the tool desired as it comes around into view. This is particularly easy to see on the single point tool shown however, on any particular tool could be designed such that a tool holder other portion had a suitable flag such as shown in FIG. 8, item #521 in order to provide this indication. For example a flag could actually be composed of an indented portion of the tool which would cause light to be lost that would be reflected off of it. This could be simply a hole such as hole 1240 drilled into the boring bar shown which would then be sensed by a sensor specifically for such a cuing hole 1245 shown on the end of the sensor head. There are innumerable different ways of phasing the flash gun in order to catch the tool at the correct location. Indeed many machining centers have keyed tool locators allowing easy use of rotational encoders.

The sensing can be easily provided herein by utilizing solid state matrix array 1250 on whose face the image of the tool edge zone 1220 is formed by lens 1252 acting through mirror 1255.

In the version shown, the matrix diode array might typically have a 250×250 element array which would be imaged on a 1 to 1 basis roughly to look at a ¼" square zone of the tooling. This is usually quite ample in order to totally define a cutter's radial location in space as well as the length of tooling, the contour of taps etc. The resolution nominally is 0.001 inch of this unit with a fixed threshold and for this reason resolution extension such as described relative to FIG. 13 and other circuits is highly desirable in order to improve the resolution to at least 0.0001 inch or better.

There is another important thing to notice for utmost flexibility in inspection of these tools. We must ask the question is the ¼" measuring zone enough and are all the tools at the same place? Clearly, if the tools that are fed from the changer into the tool holder are of varying length the travelling column in its z axis motion will have to stop at a position which is not the actual tool change location in order to accomplish the measurement. This does not lose much cycle time since it has to go through that position anyway but it is obvious that one might also provide this motion by having a z axis slide such as 1270 in order to move the sensor unit in and out to accommodate the different lengths in tools.

Of considerable further interest is the thought of actually using the z axis motion to accomplish a scan of the tool in the z axis, ie. the tool longitudinal axis. In this case, one can consider a linear diode array as opposed to the matrix array, such as linear array shown in dotted lines 1280 in the FIG. In this case, one could for example stop the rotational motion and use a continuous light source 1235 and simply scan the linear array down the axis of the tool therefore reading in thousands upon thousands of lines of information concerning the shape, length, etc. of the tool. This is particularly advantageous for example in contouring taps for thread form etc.

This also would be of considerable use since the linear array can have typically far greater range—an order of at least 8 times higher range for example which would allow it to cover let us say up to a 2 inch field of view which could allow whole diameters of drills, taps etc. to be sensed at once. It should be noted that the combination of the higher range in the x axis provided by the linear array plus the obvious huge range of the encoders on the machine's mechanical z axis, for the optional sensor z axis) would allow contouring of virtually any size tool as well as the accurate contouring of face mills whose cutting edges are facing forward as opposed to the side as in the figure shown. It should be noted that face mills can be handled with the matrix array system but the resolution enhancement is often provided best only in one axis and does not become as effective for the face mill case.

Naturally the disadvantage of the linear diode array system is that it is slow since it generally requires mechanical motion to be made. Furthermore, if the tool was rotating, it cannot take in a whole 2 dimensional field of view in a flash but would instead require a large number of rotational cycles in order to read in a large number of data points at strobe locations in the z axis.

While a profile image type of sensor has here been described, the concept of such tool inspection can also be accomplished with triangulating type sensors such as those described in a copending application U.S. Ser. No. 34,278, filed Apr. 30, 1979, now U.S. Pat. No. 4,373,804. These sensors utilize images of reflected light from the part and are in general more expensive relative to the one shown in FIG. 15, for any given range and resolution. However, certain tool forms could be best sensed with such a sensor and use of same is considered part of this invention.

The provision of such sensing equipment on machine tools should offer a completely new capability to such tools in allowing their unattended operation with no concern over improper tool setting, tool damage which can result from hitting porosity etc. in bores, and all the other maladies that affect quality of machine products on computer controlled machines. It is the final link in the loop and allows accurate prediction when tools should be changed resulting in in creased productivity due to optimizing tool life etc.

FIG. 16A

Figure 16A:
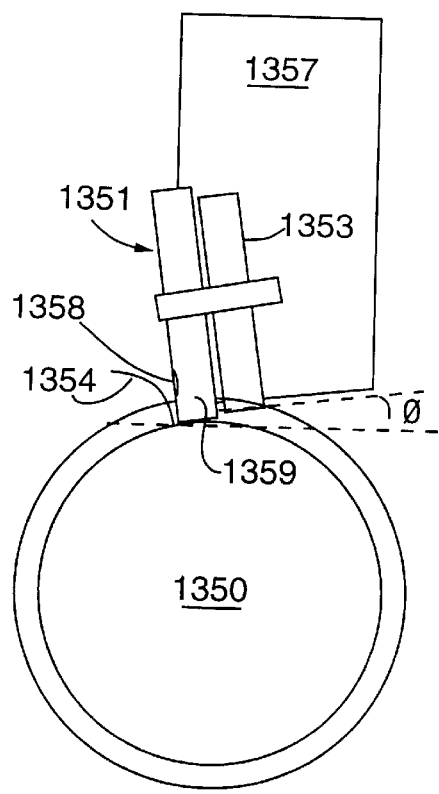
FIGS. 16(A–D) illustrates an additional tool sensing embodiment.

To further illustrate operation the tool edge measurement aspects of the invention, the basic lathe tool edge arrangement used to turn a part is illustrated in FIG. 16A. A cylindrical part 1350 is being cut by tool insert 1351, separated from tool holder 1357 typically by a spacer 1353. The tool is manufactured or mounted to have a relief angle ø to the tangent to the part OD and may also be relieved by an angle β (FIG. 16B) with respect to its flank face and perpendicular to the part centerline (and the machine z axis).

An optional force and/or acceleration sensor to detect forces transmitted through tool holder 1357 can be used to determine cutting force related characteristics. For best results this should be as close a possible to the tool, but wiring and other problems have typically made the location somewhat remote. For this reason another aspect of the invention to optically monitor tool deflection under load and thus force as described in the embodiments above can alternatively be used.

The cutting action due to the rotation of the part (shown rotating in a counter clockwise direction), create s chip 1354, and an associated wearing of the tool face 1358 due to the chip, which is categorized in the literature as "crater wear".

FIG. 16B

Figure 16C:
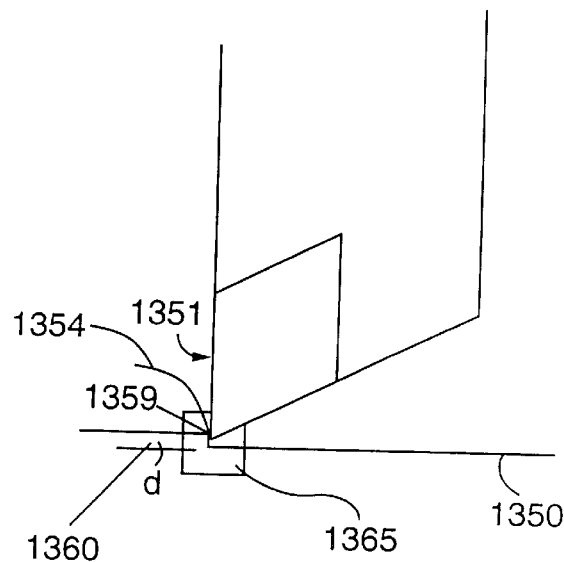
Figure 16B:
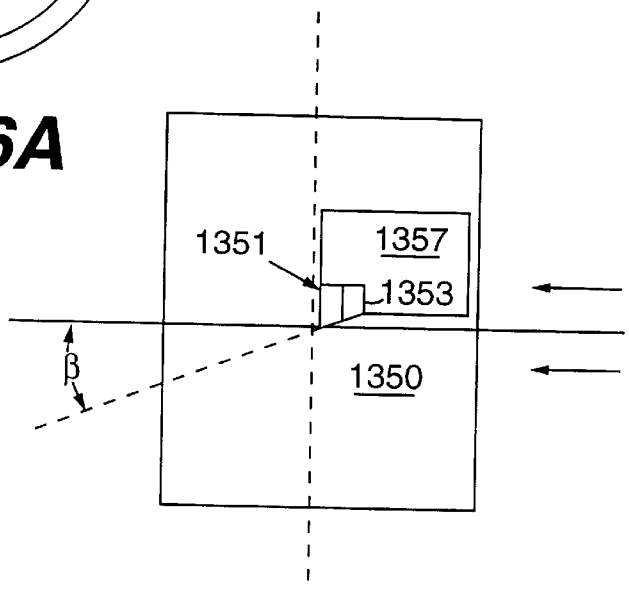

FIG. 16B illustrates a top view of the FIG. 16A, showing part 1350 and insert 1351. An angle β exists between the flank face of the tool and the perpendicular to the centerline of the part.

FIG. 16C

As seen in the side view of FIG. 16C, the depth of cut being taken, "9" also creates wear on the tool flank 1359, the surface of which extends out of the plane of the paper. The rectangle 1365 delineates the imaged zone of the tool (and, optionally the part), used in the invention to determine location, wear and damage of the tool. A typical parallelogram shaped cutter insert used in finishing tools is shown, that in which the strictest control of size and wear is required.

FIG. 16D

Figure 16D:
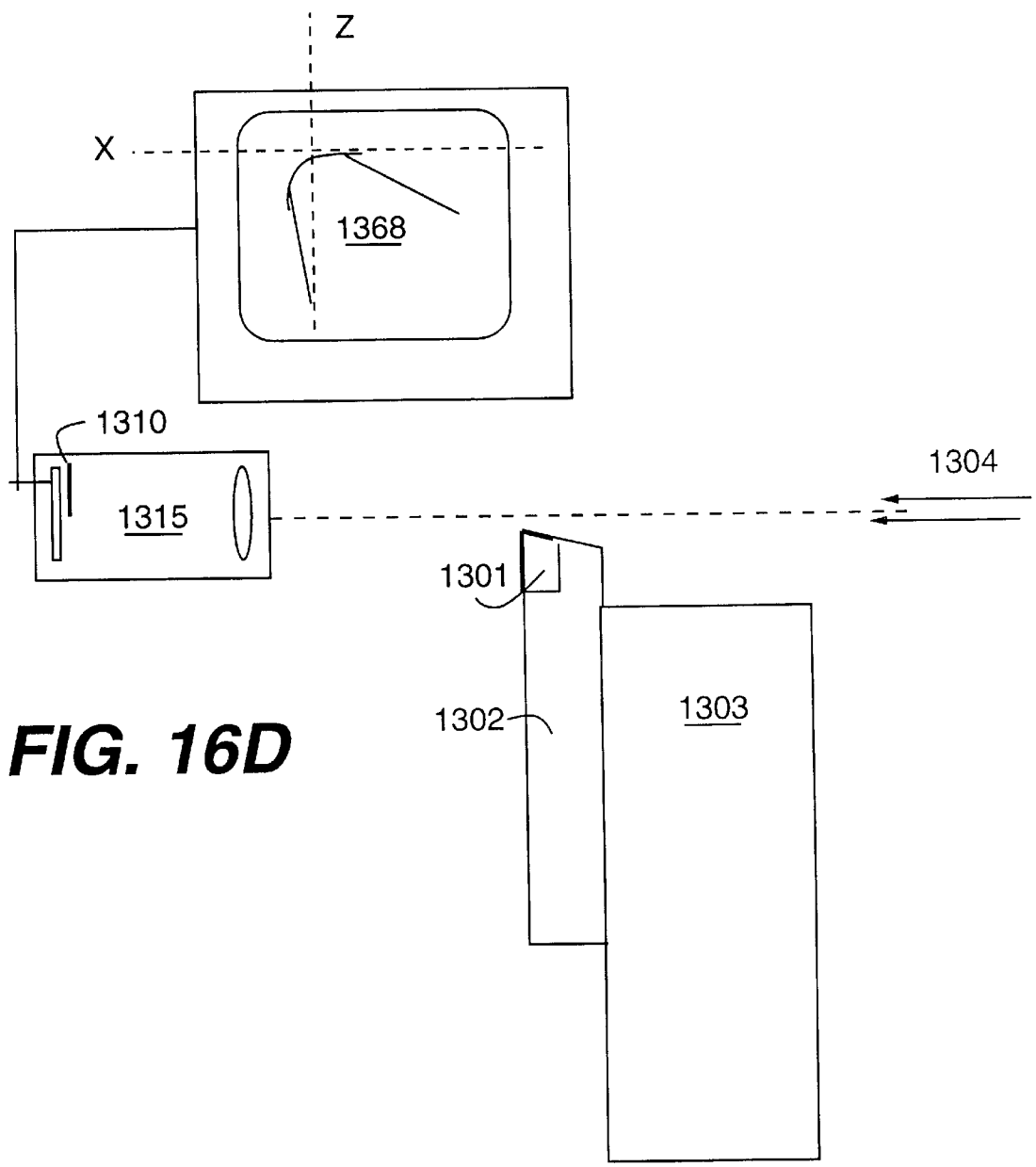

FIG. 16D further illustrates a tool measuring embodiment of the invention similar to FIG. 8, in which the edge of a tool insert 1301, in lathe tool holder 1302 attached to turret 1303 in this case is illuminated by light 1304 at an angle to at least one tool face such as to clearly define the edge image 1310 formed on a solid state TV Camera 1315 such as an Elmo Brand EM 102BW. Light 1304 can be provided from an external source or projected and returned via a retroreflective mirror source, such as shown in FIG. 22 and other figures of the invention.

If we look now at a representative operator display of the tool edge 1368 we see that such a display of the edge location and condition can be very useful. First the position of a new tool can be determined in memory, and the position of edge locations, either due to additional tools that are put in, or due to wear in the tool, can be compared. This also can be used to determine the accuracy of the machine to bring the tool back to a given position.

The operator can set a crosshair, if he desires, at the location at which the new tool is located, and make all comparisons from there. Conversely the machine can be directed to position the tool at the mean position on the screen, and from which the crosshair can be used to visually depict the differences caused by wear or other conditions.

FIG. 17A

Figure 17A:
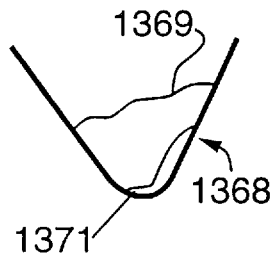
FIGS. 17(A–D) illustrates further tool edge sensing embodiments.

A close-up of the tool edge is shown in FIG. 17A, in which the nose radius region of the lathe tool insert 1368, is shown. It is typically this zone that is imaged by the camera system, for maximum resolution determination of tool wear. Where only an indication of gross breakage is desired, the camera of the invention can image a larger zone of the tool, allowing different types of tools, possibly different locations to be placed in front of the camera, used in this case to simply see if they were broken (such as broken tool image 1369). However, for the maximum resolution of breakage (for example of a 0.001" chip off of ceramic tools 1371), and particularly wear, one needs a higher magnification that often requires a relatively limited field of view, of typically 5 mm square or less being taken, as shown.

As determined from the image measured with the array of the tool edge sensor camera, the line AA indicates the effective size the tool will cut, reduced from the original edge profile which can be stored for comparison. As shown, the flank surface of the tool has been worn, reducing the tool edge in that region. A tool edge from previous measurements at a time a complete break occurred is also stored for comparison to the instant image to see if this condition is being approached (signifying a tool change at an appropriate time).

FIG. 17B and 17C

At this point, we need to consider the situation from the optical imaging and measurement point of view. A goal is to accurately measure the wear of the tool, and, as well, the position of the tool. Particularly in FIG. 16 above, and expanded here in FIGS. 17D and 17C, we see that where the tool is at a substantial angle β with respect to a face of the tool, a distinct optical image can be formed of the cutting edge, with no appreciable confusing reflections from the face.

However, if this angle β is small (e.g. 0–10°), as it often is for some tools, optical determination of the edge condition becomes more difficult unless the sensor is cocked at a larger angle.

Figure 17B:
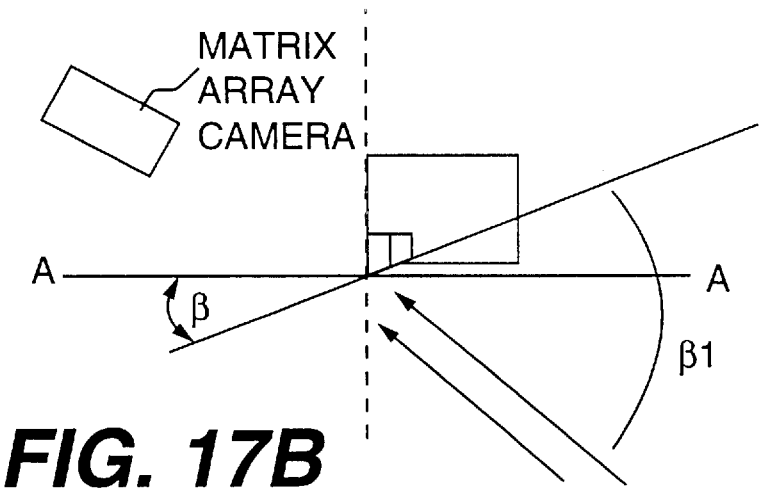
Figure 17C:
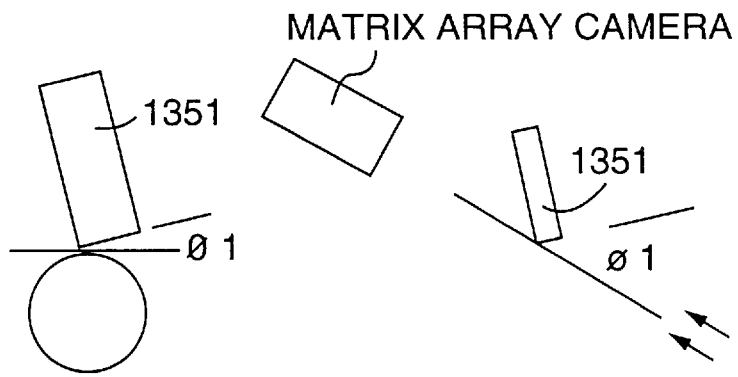

I have found therefore, that it is desirable when measuring such tools, to measure at a larger angle with respect to a tool face, such as ø1 (FIG. 17C) or β1(FIG. 17B). I have found that the best angles ø1 for tool edge mensuration in a dependable manner that corresponds to tool wear, are indeed between 20–70°. Similar situation applies for the angle β1 with respect to the flank face where the maximum wear occurs.

Use of significant angle's ø1 and β1 creates a new form of reliable and accurate tool characterization, capable of use in machines proper, where the measured value is a composite of the effects caused by crater wear and flank wear. Unlike references in the literature, I feel the exact type of wear in this case is not of interest, only that it results in the wearing down of the edge. Typically too in many processes one type of wear or the other will predominate, and a choice of the angles used can tend to accentuate the sensitivity to one or the other. I have found, for example, that the angles that emphasize flank wear are typically of the most used. Indeed for certain type of ceramic tools, the crater wear is almost non-existent, but the tool breakage is manifested as a chipping of the edge.

It is noted that the light source and camera based sensor can also be located on a movable actuator to bring it into position to measure the tool, if desired. This way it can be away from contamination and out of the way of the machine movements when not needed. (see FIG. 19)

FIG. 17D

Figure 17D:
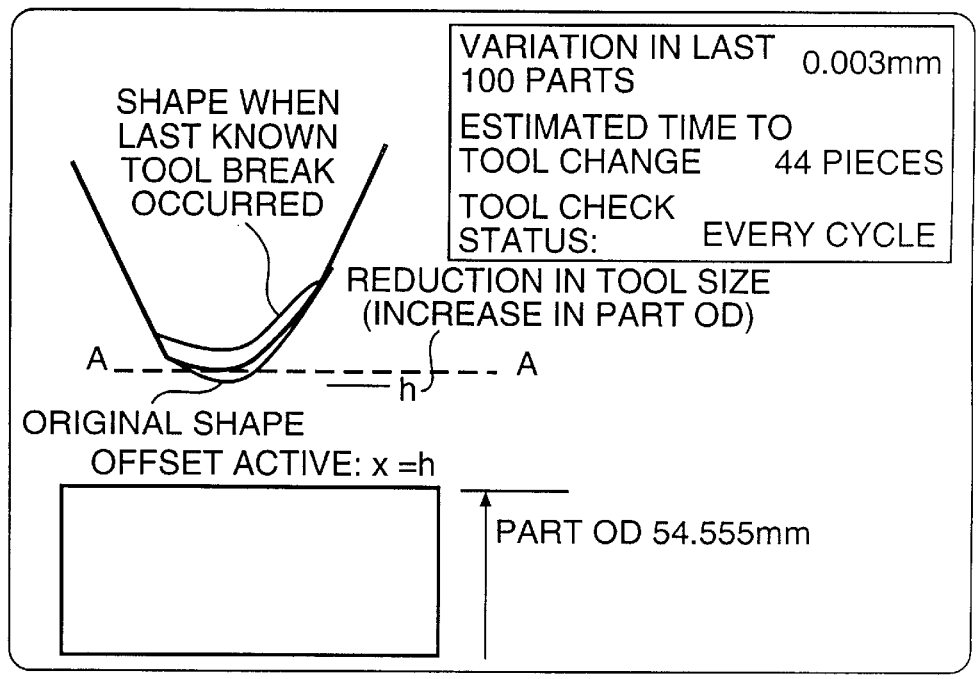

Tests also indicate that the finish and size of the parts produced with a tool measured in this manner can be predicted, and these effects as well can be displayed to the operator in a data display, such as that shown in FIG. 17D. Such data can be overlaid with the image visual data of the part or tool, or both (as shown), including any profile changes occurring in either due to tool wear or other causes. Sensed data taken with other sensors can also be so displayed.

Note that the tool in this case is worn away, and using the algorithm chosen, the effective cutting size is determined by line A—A, which has been shown cutting part to size 54.555 mm.

The NC control unit of the machine tool can be commanded by an intelligence module such as 1450 shown in FIG. 19 below, for example, to change the tool when a pre-determined finish value predicted by wear related erosion of the tool edge has been exceeded, or to offset the tool when a given size has been exceeded. The machine can check the tool, at a more frequent interval (e.g. after each cut, when it is reaching the end of its life, as predicted from the number of parts cut, if such data is available (as it often is in high production applications). In low production applications, the time of cutting, as opposed to the number of parts, usually becomes the criteria for more frequent inspection of the tool, for example.

FIGS. 18(A–B)

Figure 18A:
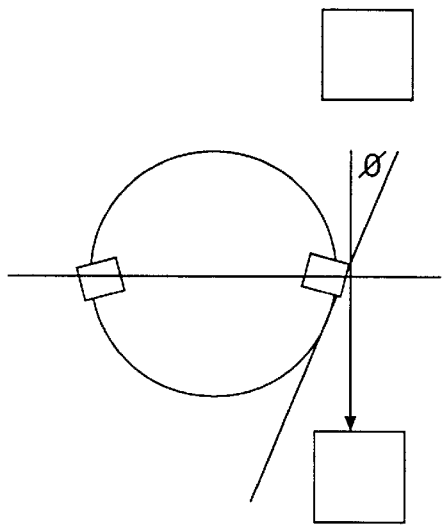
FIGS. 18(A,B)illustrates a method for inspecting rotating tools, for example boring tools, also from a plurality of angles.
Figure 18B:
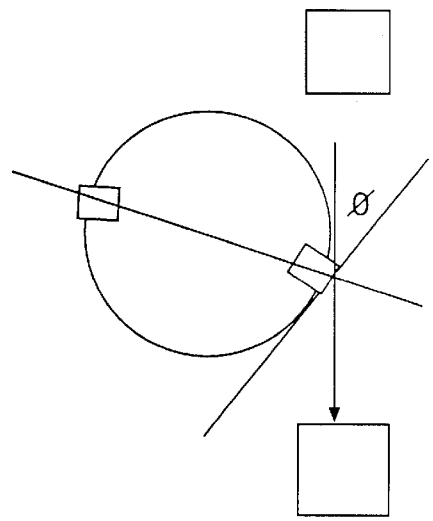

FIGS. 18(A–B) illustrates the measurement of breakage, wear, and position of a milling tool, or boring tool according to the invention, which can also be monitored at various angles, not only the tangential, but at angles other than tangential to the tool rotation. It is also noted that the tool edge can be sensed either continuously while rotating, or at discreet stopped positions. Indeed one can read tool edge data at various rotation angles, by simply taking different points along the rotation, such as shown in FIGS. 18A, B. One can keep track of the positions, with encoders in the rotation of the tool, and even position the tools at a fixed point, or can read them on the fly, using pulsing techniques described in the references, or using high speed shutters on the camera unit. By using different angles, different tool wear/breakage characteristics can be monitored.

Most such tools have multiple edges at different circumferential positions, either insertable or of one piece the flutes of a carbide end mill, tap, or drill. In this case the location or contour of any or all of the edges can be measured as the tool is rotated, and the variation in each determined, as well as the maximum diameter or radius which will be cut by the tool. If too much wear, or variation exists it is desirable to change the tool.

FIG. 19A

Another aspect of the invention is that it allows the machine, as noted above, to teach itself what is the correct response for the given tool force scenario. This aspect of the invention has 3 major advantages:

1. It allows one to start out sensitive, and slowly become less so in an orderly manner, such that the correct settings for a particular machining scenario are arrived at. Indeed, these settings can be different for the each of the tools in a given turret, for example, which is another capability not present in today's machine tools. The reason it is not there is probably because of the fact that the existing sensing units, in order to obtain reliable signals, have to have painstaking operator setting for each individual condition, which most operators and plants are not willing to do.

2. It allows one to develop these criteria automatically in the machine itself without such painstaking work, and this allows the sensing to be used for a larger variety of tools and part conditions, including parts which vary in hardness, batch to batch, or in their depths of cuts, or other conditions that are often ignored in manufacturing research laboratory work, but are very prevalent on the factory floor.

3. It can allow the integration of multiple sensory inputs. For example, a basic setting for an accelerometer such as 1494 on the turret 1430 of the lathe 1435 of FIG. 19, combined with, let us say, a load monitoring current sensor on the machine, for example, 1495 on the spindle drive. Data from these sensors, and the tool sensor and any part sensors of the invention is processed by intelligence controller 1450 and used to control the action of the CNC machine control.

This allows the acceleration sensor to look for crashes, which cause unmistakable acceleration and seismic signals, and indeed allows one to take 2–3 readings of such accelerometers at different locations, and correlate them so that coincident events can be registered as a true signal. Conversely the much more slowly responding signals are those of the current monitoring on the spindle and axis motor drives. In this case, sole build-ups of tool forces due to changes in the cutting tool surface are the usual results. Although in the case of the tool break, in most cases, the currents also go up, and in many cases this is sufficient to signal the potential change of tool. Again though, because of the difficulties in assuring this, the optical sensor of the invention is a major step forward to assisting this.

Similar to the above lathe related portions of the invention, it is possible to use the sensed tool force signal from the force plate 1440, typically measuring the sheer stress on the plate that is a function of tooling forces, to act as a trip wire to cause the tool to check itself on the next cycle for example, due to a potential break, or to even stop machining, and go back to a checking position. Other transduction methods, such as strain gaged spindle bearings can be used to pick up signals indicative of tool damage. Even simple load monitoring of the drive to the spindle, or the feed force can create signatures, which can act as a potential trip wire to engage the optical sensor tool edge check.

Figure 19A:
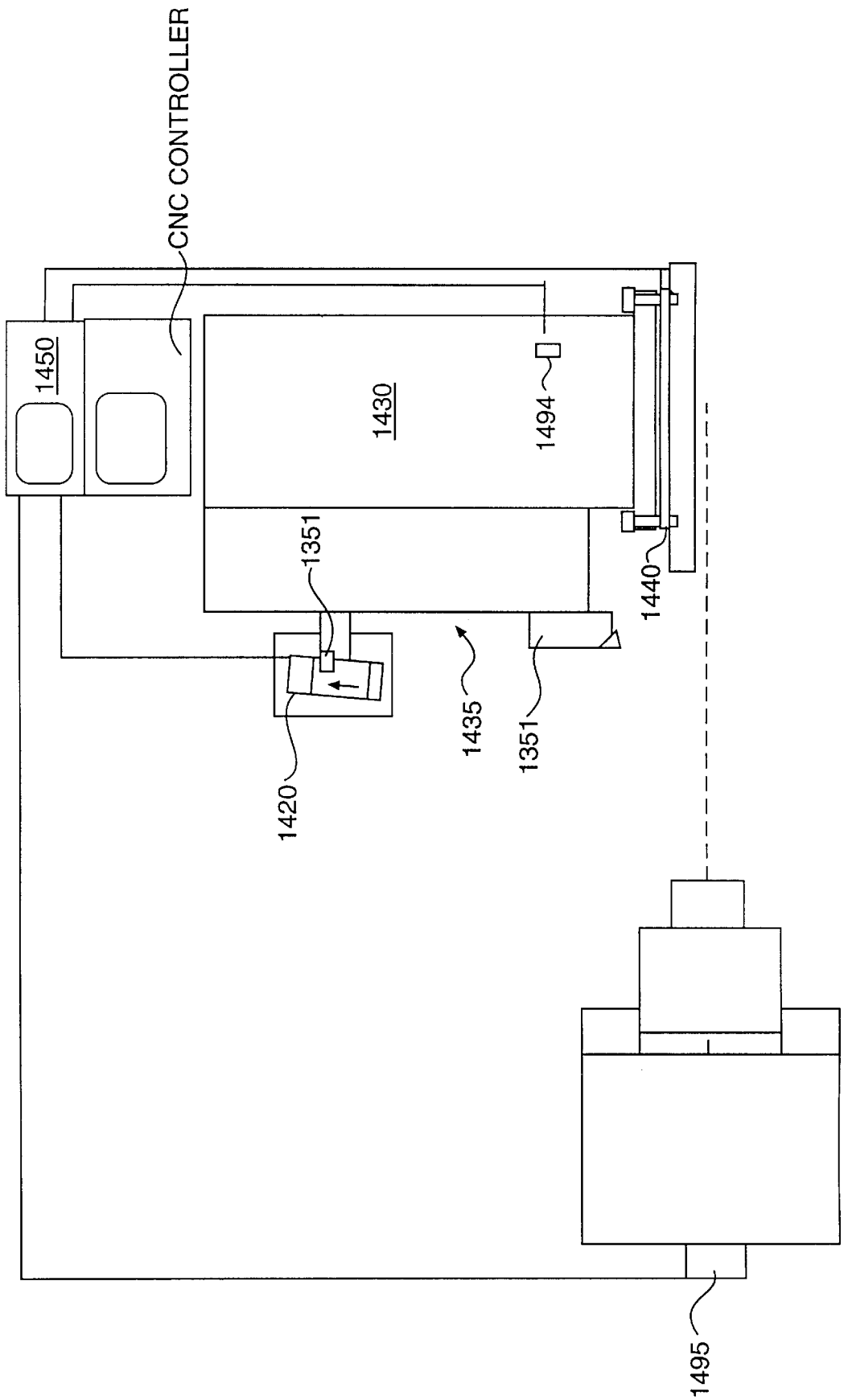
FIGS. 19(A,B,C) illustrates a tool sensing trip wire confirmation embodiment of the invention.
Figure 20:
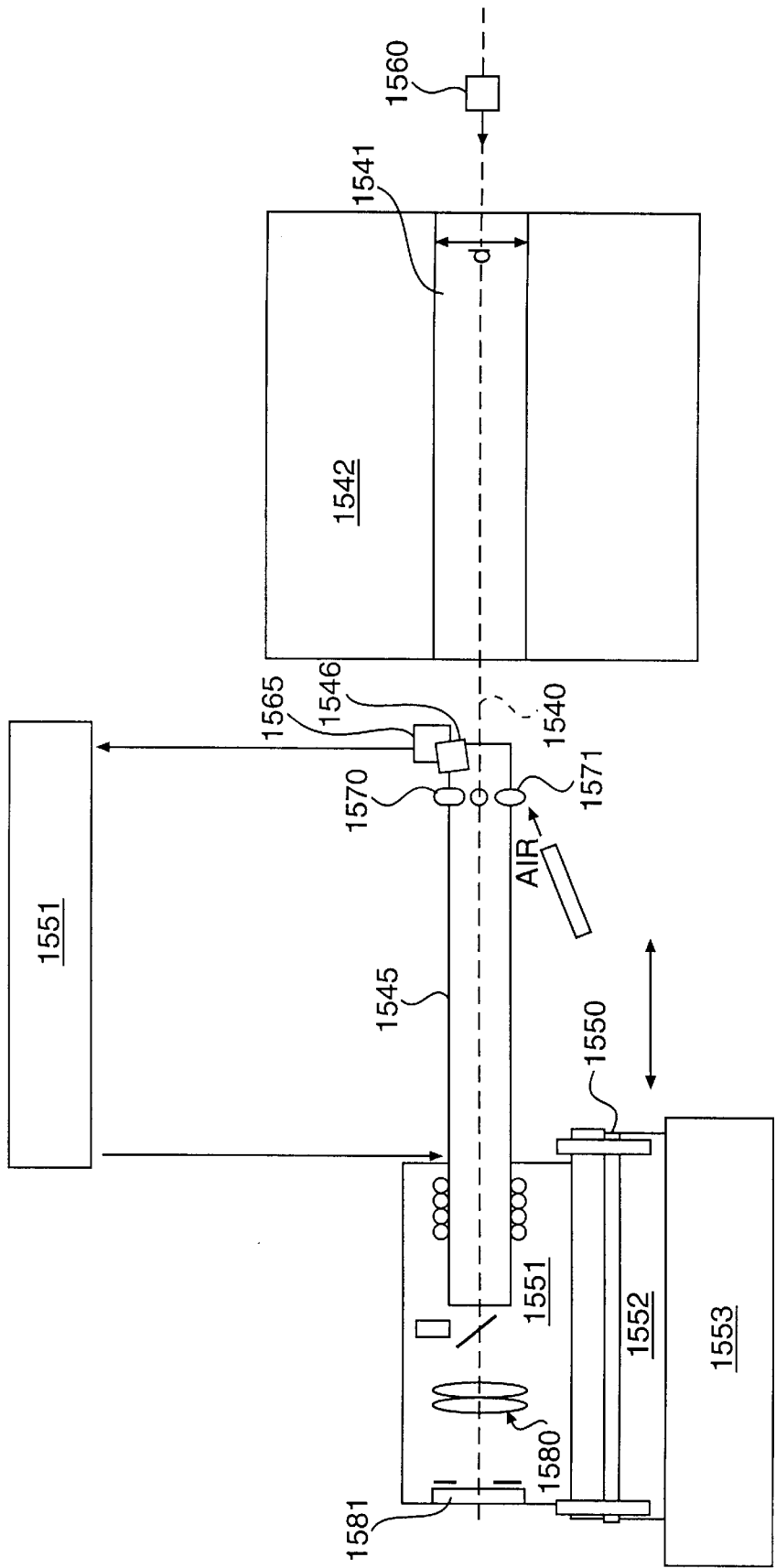
FIG. 20 illustrates an improved method for utilizing a contact probe within a tool according to the invention.

It is noted that in FIG. 19A, the tool turret, or in FIG. 20 the spindle housing holding the tool, is secured to the moving portion of the machine by bolts. These bolts, generally 4 in number, clearly have to carry the load generated by the cutting forces in the lateral direction (shear) and in the direction that they are extensible. It is known to have up to 3 axis measurements of force in washers under such bolts, and piezoelectric load washers are provided by Kistler A. G.

Typical Inputs to Intelligence controller 1450 from Machine CNC:

Tool in inspection position.

Tool in zone of cutting to be monitored.

Coolant Off OK (if desired).

Typical Inputs to CNC from 1450.

Emergency Stop.

Dimension offset.

Tool change.

The sensing of broken boring or milling or drilling or tapping tools can also be operated on the trip wire approach mentioned above for lathes. In this case, the broken tool sensing cycle (optional) is ideally actuated when the force signals suggest that there is reasonable probability that the tool is broken, or becoming dull through wear to the extent where change or rotation of the insert might be needed. In this case, the shutter on the optical sensor can open up and the sensor can make the reading.

Note that the light source and camera of the tool edge sensor 1420 can be built like in a "C" shape and used to look at a tool in the turret of a lathe for example when the turret is indexed to a tool checking position—e.g. at 10 O'clock as shown, where the sensor is optionally actuated out from behind one of the lathe splash guards to generally a fixed stop position to make the measurement. A programmable positioner can also be used such as FIG. 15.

The Following are a list of steps for various functions discussed above.

Action on Receiving a Tool Break Signal from force based or other real time sensors—one example A tool break signal received.

Machine stopped, tool retracted, coolant turned off.

Tool moved to inspection position. If used, tool sensor actuated out from protective housing behind machine bulkhead or guard.

Image taken of tool and its shape analyzed to determine damage.

Is Tool broken?

If No.

Tool break sensor force characteristic signal optionally modified, and indication of this action displayed.

Purpose of modifying is to generally reduce sensitivity of the force sensor to extraneous circumstances, such as hard spots on material, etc., causing false broken tool detection.

If tool broken, tool is changed.

Is part worth re-cutting?

If no, part ejected and new part loaded, and machining commenced.

If yes, tool moved to previous stop, and re-cut commenced.

This re-cut may be desirable to use the camera system of the invention to guide the machine to the proper point at which to begin the cut again, so that there is not a mark on the part, due to the fact that the juxtaposition of the old and new points was not achieved.

Note that in both of the above situations, it may be desirable to store the optical and force signals relating to the event for further analysis, in order that more improved operation of the sensing system or machine can be judged, and algorithms for all sorts of operations be generated.

Tool Cleanliness Steps optionally used in above tool inspection.

Tool removed from cutting area, and a) wiped, b) blown off, c) flushed with coolant, for any or all of the above, if possible before inspection. Coolant turned off if desired (to avoid splatter toward inspection area).

Tool checked with optical system of invention.

Is tool edge image satisfactory? If yes, make analysis.

If substantial material in excess of the expected tool edge contour is present, and measurement is not possible, tool is deemed to be excessively contaminated.

If so, repeat or commence blow-off, flush or wipe operation.

Read again. If tool edge meets expected criterion, store reading and make comparison to determine whether or not the shape is within bounds to create a correct finish and size part.

This criterion is typically one that meets the previously noted shape, with little or no maximum material perturbations beyond that shape.

If not okay, assume that a built up edge condition, or other problem condition exists, such as a chip wrapped around the tool.

If so:

a) abort and sense after next cut, during which presumably this condition is removed.

b) run a special cut in an unused part of the material to remove this indication and recheck.

c) engage more forceful removal means.

d) call for maintenance and/or change tool.

It is noted that just as the tool sensor can sense the position of a tool edge and confirm they are in the correct position when the turret is placed in a known location by the machine controller, so can the sensed positions of the tool be used to offset the tool position in the computer to reflect its actual position with respect to the machine axes.

FIG. 19B

It is noted that the tool sensor of the invention can qualify the tool for operation, and correlate the breakdown of the tool shape to wear and breaks via a "look back" and teach function. This allows one to analyze the tool shape history as a tool progressed to breakage. After a sufficient amount of such data is taken, this pattern can be used to look at a given tool and its history, and determine if, and when, it is likely to break in the future, or, if some other issue studied, such as surface finish history of parts produced as a function of the tool, when it would make a bad part.

Figure 19B:
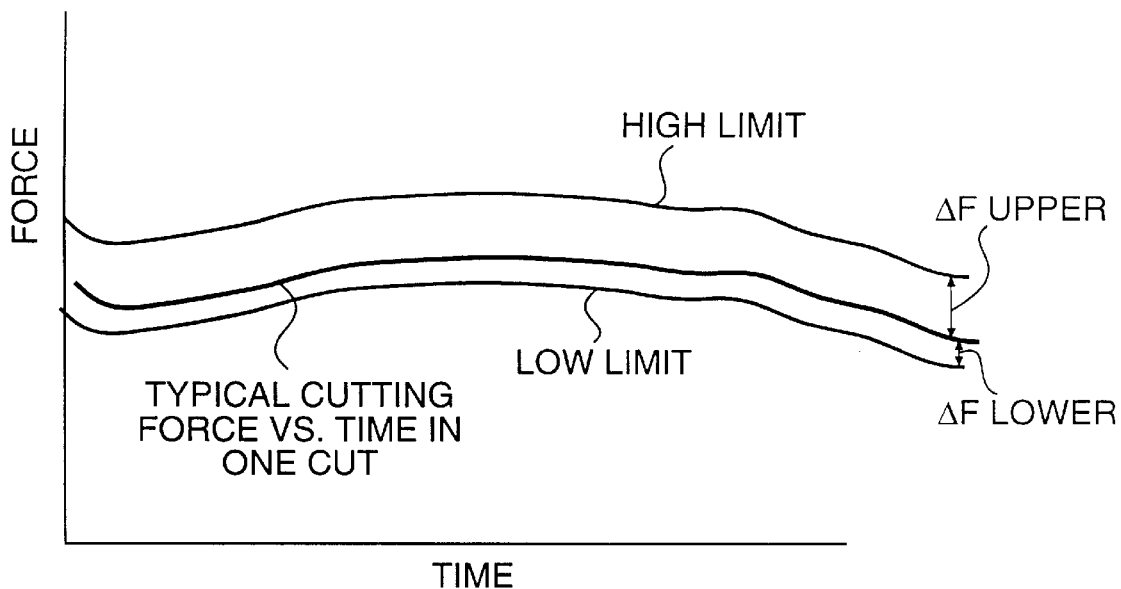

FIG. 19B illustrates an example of what can be done with the force measurement and tool inspection synergy afforded by the invention. In this case, the system learns from the data taken in order to better set the values for a given parameter; in this case by the force signals required to determine if the tool is broken (or stop the machine in event of a crash).

Illustrated is a typical scan of force data taken through a cut. High and low Limits are placed in a "floating" manner to follow the envelope of the force signal itself, using known electronic techniques, such as tapped analog delay lines, or digital memory stores. Where numerous cuts are taken on a part with a tool, each may have separate data and limits if desired.

Figure 19C:
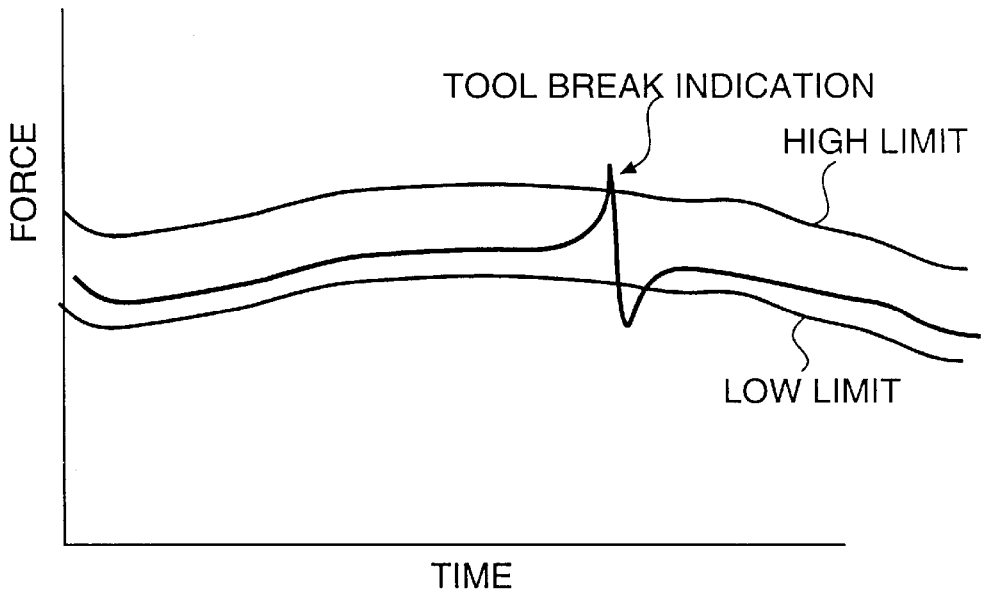

Typically, analysis may start just after the tool has entered the cut in order to avoid sharp spikes due to the onset of cutting. If a break occurs as shown in FIG. 19C, the signal probably breaks one or both of these two thresholds—if the threshold is et close enough to the normal cut signal. And additional time related criterion can also be set to discriminate types of events from the duration and amount of various signals.

The problem with such settings is that they really aren't known easily, because it varies for the type of cutter, the material, the age of the cutter, etc. One of the problems too, is that often times we wish to put the force pick ups in places that do not see the full force field, or perhaps allow use of any more than one component of force, which may not, in some cases, be the component having the most reaction to the breakage. In this case, the potential signals may be relatively low with respect to noise, allowing one to have to set the thresholds, just as closely as possible (ie ΔF small)in order to be able to catch a tool break, but not to respond to noise on the signal due to normal machine operation.

A control computer is used to set the thresholds for such measurements, or other similar types of tool related analysis measurements in ways that do not particularly depend on the actual method of determining breakage from the force signals, but more on the method of controlling the setting. Let us say for example, that in the simplest case, that we want to set ΔF to be within as close as possible to the signal obtained without tripping during normal cutting.

In order to establish this, the system equipped with the optical sensors, as shown, can do a revolutionary step; namely measure the cutting force, and holding the cutting force as a function of time in memory; then go and look at the tool. If the tool is okay, this is then stored, and the next cut taken—and sequences of cuts are taken to determine at what point one could make the setting. Then for future cuts, which could be after 3 or 4 such occurrences, these particular settings are utilized.

However, if during the future cuts, we find that we have set it too close (due to force changes relating to material variation, use of different cutting tools, or whatever), and a trigger break is detected, which is found to be false alarm by the tool edge sensor, then the settings (ΔF or other parameters) can be opened up slightly to prevent such false triggering in the future. Of some interest, is that the settings such as ΔF for the thresholds can be made not only as a function along the total length of the cut, but actually at different percentages from the normal signal, at different points along the cut, or any other criteria that allows one to more closely tailor the acceptance band of the signals to allow no breakage to the signal to occur, while still catching the breaks when they do occur.

FIG. 20

FIG. 20 illustrates the use of a rotating tool in production application, with particular emphasis on a tool that not only can have the tool sensed as described in FIG. 18 above when it is retracted, but also that can actually have a built-in diameter probe for the part. This is shown in FIG. 20, wherein a boring bar 1545 rotating about axis 1540 is used to bore a hole 1541 in part 1542. The boring tool 1545 is typically actuatable in and out via an automatic mechanism, such as Sandvik's "AutoComp".

As shown the boring tool is rotated about the axis 1540, through the action of the spindle 1551 in its housing, whose housing is attached via through force measuring plate 1550 to the saddle 1552 of a slideway 1553 that serves to move the tool in and out to effect the boring during the part rotation. For some materials, such as cast iron, this boring is done dry, others such as certain aluminums, etc., it is done wet.

In any case, when the part retracts, it can be looked at in the field of view, such as that shown in the box 1565, according the methods shown in FIG. 18 above, and the part dimension or surface finish characteristics predicted from the tool wear is used to determine the point at which the tool is either changed, or a new tool is indexed in, or the part size changed position by changing tool 1546 is made by an appropriate tool compensation device moving the tool, let us say, outwardly, compensates for wear by a distance of 1–2 microns per increment.

Air jets or other coolant washes are utilized as needed to clear the tool of any chips, or other matter that would preclude operation. Similar to other aspects described above.

The sensed positions of the tool be used to offset the tool position in the computer to reflect its actual position with respect to the machine axes. In the boring tool case of FIGS. 8 or 21, it is generally the tool edge which is moved to a generally stationary tool sensor, and its new position confirmed say as being at the correct location to bore the diameter desired. Steps in a preferred example are:

Bore hole in part.
Turn coolant off.
Stop rotation (where possible).
Retract boring tool.
Measure tool edge location of effective cutting edge.
Determine bore size cut from edge location also if applicable in consideration of any knowledge of deflection of the tool either determined empirically over time, predicted theoretically, or measured during the cut, for example using the system of FIG. 7.

If necessary, command the tool to index outward to account for wear determined and cut the next part on the next cycle (or recut the instant part if desired, and if time is available).

If the tool edge is worn too much (endangering a break to occur) or if it is broken, it can be changed. This is the only recourse if size changes on a tool that cannot be indexed, such as when the invention is used to measure the location or contour of the edges of the flutes of a carbide endmill, tap, drill.

It is noted that in some cases with new inserts, this operation requires the tool to index inward, as the insert undergoes a seating action which enlarges the size cut.

The primary goal is to look at the tool position, and from that determine the corrections required to keep the diameter d at a constant determined value. Conversely, one can also look at the tool position to reset the tool to a different value d, for example in boring a step bore, or a bore on another part put in place of part 1542, for example on a flexible line, where multiple holes are to be drilled. The optical tool monitoring also provides a method for setting the tool, insert at its correct radial location.

Also shown here however, is the possibility of measuring the part, having a built-in gage within the tool, to measure the part surface, for example on the retract cycle. This is shown with gage points 1570 & 1571, which are actuated outward (e.g. via air pressure) from protected areas within the housing of the boring tool, in order to effect the measurement at the proper time, as the part, for example, is retracted through the hole just made. This measurement can be done optically from the rear, as is shown, with lens 1580, imaging the points on detector 1581, and it is generally possible to stop the position of the boring tool, in a particular rotational location, so that this sensing can be made with the probe and detector lined up as desired to facilitate measurement (e.g. in the x,y axis of a matrix array for example). Two other members (not shown for clarity) located 90° to 1570 and 1571 can desirably also be monitored to allow a 4 paint bore characterization with respect to the centerline 1540 determined by the optical axis.

The force sensor 1550 is capable of resolving the forces of cutting in a manner satisfactory to act as a broken tool detector as described relative to lathe applications above. Other types of force sensing on the rotating tool, etc., can be used but these are very complex to implement, when control draw bars are utilized to change the tool position, as is shown herein.

To change the size d of the bore manufactured, a control signal from a computer 1551 connected to optical (or other) measurement of tool profile and size (such as shown in FIG. 19) gives an off-set command to a draw bar or other means (not shown for clarity), which then moves the tool into a new diametral location. Such tool movement systems are commonly marketed by Sandvik (AutoComp) and Valenite (Kamset).

This particular approach is substantially less expensive than having a completely separate gage station occupying another portion on a transfer machine line, which can cost a great deal more money, such as $200,000–300,000 just for the gaging station on a transfer line, not including the space cost of the extra station. This can all be avoided by interacting the tool position to the size, as noted herein.

It is also noted that the camera sensor unit can be used additionally, or alternatively to simply sense for broken tools. This of course does not save the gage station, but it does act as very reliable way we have now found to sense the broken tool. In fact, each retraction cycle of the machine into position, allows basically a "free" check of the tool. The coolant is typically turned off, the sensor unit shutter, if present, is opened, and the sensor views the tool condition. If the tool is broken, it is changed. If it is not broken, it continues to cut.

Given that one can correlate the finish to the tool edge, this variable can be also figured into the decision whether to change the tool or not.

It is noted too that the contact optical sensing units herein also offer a chance to have a wide range of bore sizes, usable with such a system. And the tool sensors herein can also handle the large range. This means that a tool compensation system can actually be used for different bore sizes within a reasonable range. It is also noted that the measuring probe or probes used to locate the part surface can be built into the rotating tool. To avoid the rotational problems of sweeping, the spindle can actually be stopped, or slowly rotating, or as pointed out above, the measurements can be taken at high speeds if stroboscopic light sources or short integration times are used.

In this case, the bore probe simply actuates out of the spindle, and the measurement is taken. On retract, the sensor unit goes into a master ring, which is used to verify function. Air blows, if necessary, are used to blow-off the edges of the contacts.

This means that the unit can bore on the outstroke and sense on the retract. If there are any problems the part tool can be compensated, and even re-bored.

Another advantage of the invention can be appreciated by consideration of FIG. 7, namely that the deflection of a boring bar or other tool can be measured and used to compensate the tool location to bore a hole that is the desired size, an alignment with other bores if any. This is further illustrated in FIG. 24, but a feature is shown in FIG. 20 similar to that of FIG. 21 below, that is to provide an external reference land mark 1560 which can be sensed with the optical system relative to a point near the cutter, or alternatively a reference in the boring bar which can be sensed by a detector 1560. In either case the goal is to sense the bar position and particularly deflection due to cutting forces and to compensate the tool.

Confirmation of Tool Breakage

In the discussion relative to FIG. 19 above, it is mentioned that one can confirm the actions of a tool force sensor in giving out a collision, or breakage, or wear signal by looking at the tool with an optical tool sensor. This is proven to be a very important aspect of the invention. As noted above, the commercial force sensors by themselves have not been well received in the trade, because of the difficulty in determining valid force signals amongst all of the other noise created by the machine and cutting action.

The invention herein in one stroke solves this historic problem in the machine tool industry by creating a mechanism by which the sensed data from the force sensor can be used, as now, to shut the machine down, but in this case retract the tool into the tool inspection position, where the optical sensor of the invention measures the shape of the tool and determines whether the tool is broken (due to either a break of the insert, in operation, or out and out crash, and two determines any wear thereon. In fact, the sensor used solely for breakage can have a much coarser resolution as pointed out above, then the one used for wear, which has to detect small changes, particularly so if it is going to be used to predict an accurate side from the sensed tool datum.

The biggest concern in high production applications with such tool force monitoring is most desired (due to unattended operation and the resultant impossibility of an operator detecting a crash either audibly or visibly), is that the sensor unit has the ability to determine if the break has indeed occurred, and if not, the primary worry of most production people, who are nervous, is that they false trigger of a force sensor and cause their machine, and even the whole line, with which it is associated to be shut down. The tool sensing parameters can be actually reset to be somewhat less sensitive to the conditions that cause the break. This means that over a period of time, and for a given batch of stock the machine can actually learn what the correct settings are.

In operation, one would start with the most sensitive setting of the force criteria for breakage determination, such as looking at the force ratio between the tangential and radial forces, for example. Then after a false trigger, the sensitivity for activation could be reduced. Or, even more intelligently, if the signals of individual forces both tangential and radial had been stored, and one was seen to be not indicative of the break condition on reflection, just its amplification constant say could be changed.

This ability of the invention to compare previous signals of transducers, based on analysis of actual results on the tool or part gathered by reliable sensors is a major feature of the invention.

The other advantage of the use of the force or acceleration sensors as a trip wire, with a final arbiter of breakage to be made by the optical sensor, is that in many cases, a simpler monitoring of the suspect condition of the machine or tool can be utilized. This is particularly true, since we are not concerned with the occasional false reject, since in many cases, the tool monitoring cycle can be shared in time with the load/unload cycle of the machine, and therefore costs little or nothing in terms of machine cycle. This means that the more dependable use, for example, of 2 axis force plates under the turret on NC lathes, and even 3 axis force plates for maximum prediction of wear that have been marketed to date, are not necessarily required. A single axis of force in the lathe case, particularly in the radial, tangential, or axial direction, or some other signal from the machine, such as acceleration from one or more accelerometers located on the machine, or even in certain cases, electrical load monitoring of the motor currents of the spindle, or the axes drives can all be used as potential trip wire signals.

Indeed because of the inventions ability to check the work of the signal monitoring, the sensing unit can, generally speaking, be less sophisticated, and possibly less intrusive into the machine's environment, than the force monitoring devices, used heretofore, which typically (if they are reliable at all) have been expensive, and require substantial machine modifications.

Figure 21A:
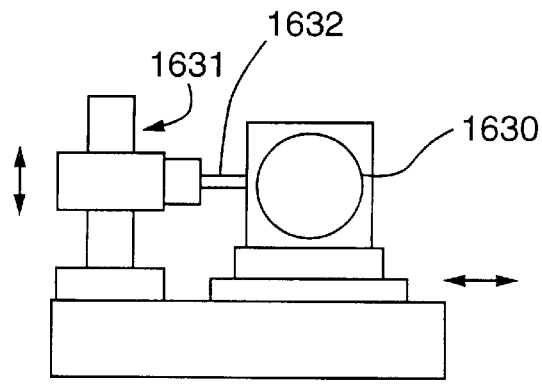
FIGS. 21(A–D) illustrates probes for mills and CMMs.
Figure 21B:
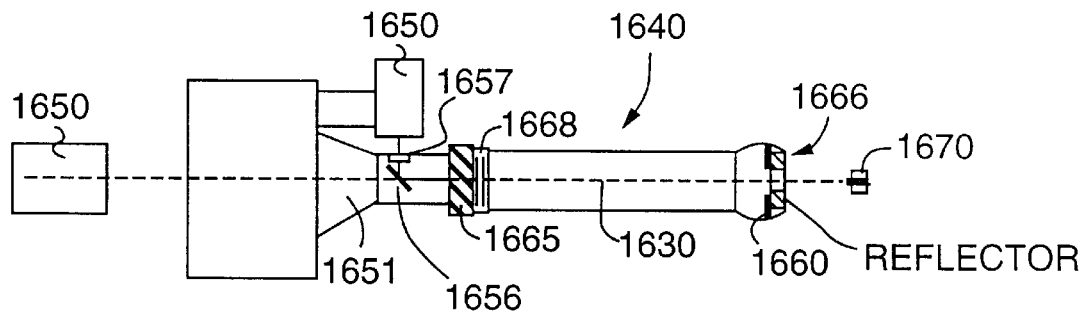

FIGS. 21A and 21B

FIG. 21A illustrates a contour milling embodiment of the invention in which a turbine blank 1630 is being machined by milling machine 1631, using endmill 1632, known in the art.

A contact optical probe 1640 is shown, patterned after that above with the capability of interchangeable probe heads and landmark detection. It is based on the same concept shown in FIG. 22A. A sensor unit such as 1650 is utilized such that the light source and imaging optics and image position sensing chip can be located remotely from the working portion. As noted previously, the light source can in some cases be provided in the probe (in place of the retroreflector) or externally. The image position sensing chip can be one axis or preferably two axis, and can be either a matrix array or an analog continuous device. The lens unit, as in FIG. 6, further provides an inviolate optical axis (1630) from which measurements can be made, even if the sensor probe 1640 is taken out to allow a tool to be used, or interchanged with another probe having a different length, diameter, point distribution or other characteristic. To facilitate such interchange the sensor has the same tapered morse coupling 1651 that the machine has. Other methods of changing sensors can also be used, such as bayonet mounts, screw thread mounts and the like. These mounts can also be used to add probe tips, say for different effective measuring diameters, at points toward the end of the probe (the right side as shown in the drawing).

A unique down the spindle axis probe capability is possible, with the sensor 1650' located in the machine behind the spindle (hollow in this case), or external via a right angle mirror or pentaprism as shown, 1650.

In this case the sensor unit 1650 images via beam splitter 1656 and window 1657 and determines the position (desirably in both x and y axes) of the inner edge of ring member 1660 which "floats" due too the action of flexure 1665 with the position of ball shaped contact member 1666 which approximates the shape of the ball nose end mill used to cut the part. In this manner, one can drive the machine with the NC cutter program that made the part, and the ball nosed probe herein reads the deviation of the part surface from where the tool was previously directed to go. The effects of wear and tool or part deformation under load are thus discerned, and the part corrected in a subsequent machining operation. This data can be used to inspect the part, or to derive corrections to the NC program, or to the machine parameters, also in combination with force, finish and other sensing systems of the invention.

Other means than the flexure shown (for example a common two axis deformable type) can act to urge the contact probe against the part surface. The exact return of the probe tip to mechanical zero position is not necessary as the rest position value (not in contact with the part) of the probe position can be determined by the sensor 1650 and used to offset the readings obtained.

The sensor unit is optionally capable of seeing through the end of the probe to determine location of part image features, or special landmarks such as reflective target 1670 within its field of view. These can be retroreflective, self luminous or anything that is able to be sensed by the sensor chip of the sensor portion 1650. Such a landmark can be used to reference the machine to the part, to a pallet, to the machine base or any other suitable object point. This can help to zero the probe at the point coincident with the machine program that made the part to be inspected. Certain aspects of its use has been described in part in reference 3.

The probe can optionally be equipped with a z axis measuring capability using a suitable z axis electronic measuring device known in the art, such as spring loaded ring shaped capacitor plate set 1668 connected to signal conditioning electronics and readout not shown.

Figure 21C:
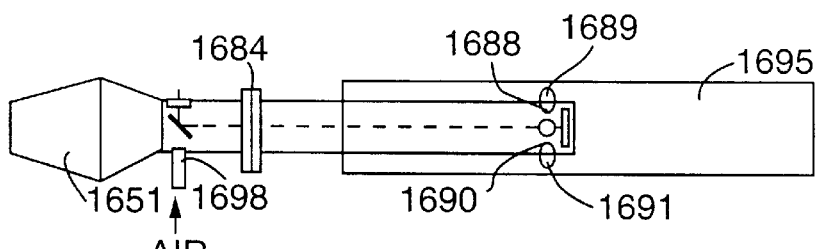
Figure 21D:
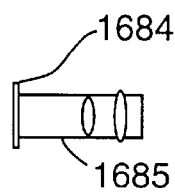

Another probe type which can be used is 1680 shown in FIG. 21C, and is a four point probe version of that shown above. It is very useful for determination of bore size, contour, and ovality at points 90 degree apart. In this case the back end of individual contact points is measured, such as edge 1688 of contact member 1689, and edge 1690 of member 1691. The points are typically spring loaded outward against the part to be measured. However they can also be spring loaded to be not in contact with the bore in question and actuated outward against the bore such as 1695, by action of electro-mechanical or pneumatic means such as air pressure line 1698. The probe tips can thus be recessed during insertion of the probe in the bore, or during other actions using the probe, whose four (for example) points can also be used to touch surfaces such as planes of a part (eg a cylinder head bank face).

The probe described in FIG. 21 is also utilizable on coordinate measuring machines, lathes, and other machines of production.

FIG. 21D

It is noted that the probe can also be constructed so one can just change the working end of the probe device, to accomplish different tasks. For example using a bayonet coupling 1684, the bore probe of FIG. 22C can be interchanged for accessory probe 1685 which provides high magnification microscopic viewing of small features. Other probe designs such as different bore sizes, touch probes, and a host of other such optical sections can be interchanged, as can wired probes, with more difficulty.

FIG. 22A

One problem of adding sensors such as tool force sensors, or part gages into the machining tool locations on the turrets is that present lathes are simply not set up for the wiring required. A way to accomplish a "wireless" transmission is by direct optical image transmission, as shown on FIG. 22A. While operable with numerous types of optical sensors for size and finish of parts, it is shown herein, relative to a contacting touch probe and tool location sensor. In this case, tool insert 1705 in tool holder 1706 is mounted to turret plate 1708, and is used to cut workpiece 1712. In an opening in the tool holder 1706 is a contact member 1725, urged by spring 1724 to contact the workpiece 1712.

The position of the edge 1726 of the opposite end of the member 1725 from that point contacting the workpiece is monitored by sensor 1750 mounted to a non-rotating portion of the turret or machine base 1751 at the cutting position. Light source 1715 in sensor 1750 is directed by a reflection from beam splitter 1716 to multi-element retroreflector 1730, (preferably scotch light 7615) which directs the light from the edge 1726 (or other point) of the member 1725 back to lens system 1717, which forms the image 1728 of the member edge onto camera chip 1720, which can either be a linear array scanning in the vertical(x) direction, or a matrix array scanning in both the vertical, and tangential (y) directions of the workpiece. This image can not only be formed of where the gage member is in space relative to the optical axis of the lens system 1717, or a zero point on the camera 1720, but also the position of a datum on the tool, such as the edge 1740 of member 1741 can also be monitored.

It is noted that a retroreflective arrangement as shown is not necessarily required, one could have this edge self luminous or backlit with light even through a window from light sources mounted at the end of a lathe, or wherever. As an example point 1726 can include a LED which is positioned relative to the surface of the member 1712, and whose position can be monitored by an analog spot position detector 1720, for example a UDT SC10. Generally however digital array based systems are more accurate in plant conditions, as they do not drift with temperature.

Figure 22B:
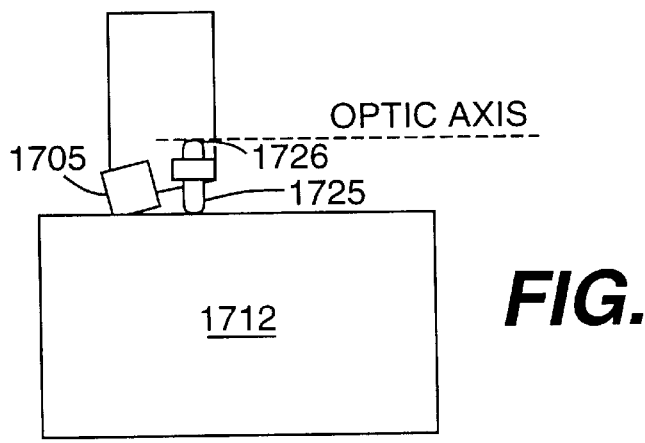
FIGS. 22(A–D) illustrates a Contact optical sensor embodiment, also in a tool, and further illustrating a remote sensing configuration with no wires.
FIGS. 22E illustrates a coded grating useful in the sensor of FIG. 22(A–D)
Figure 22C:
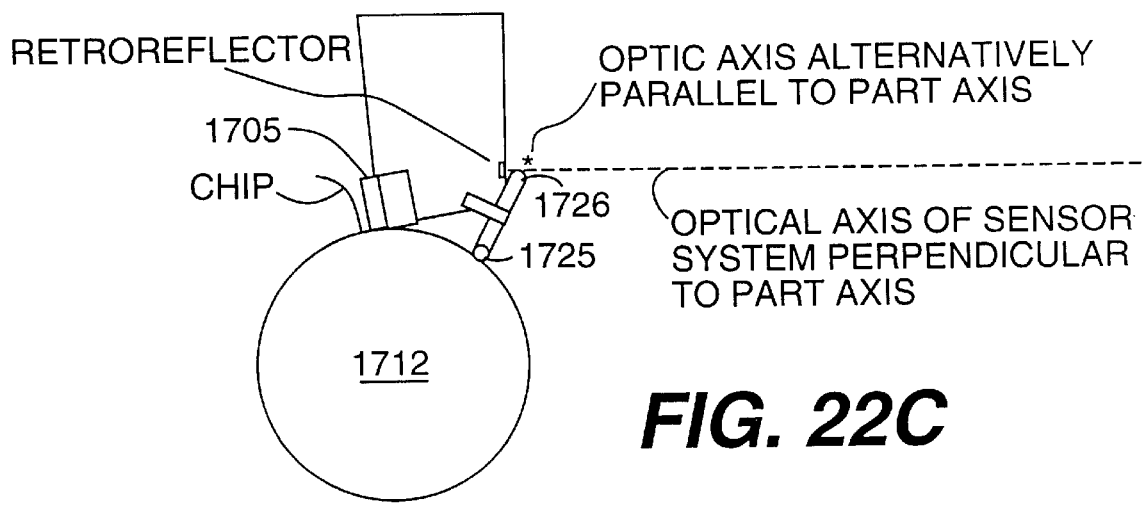

Contact member 1725 can be located either axially behind the tool (z Direction) as shown in FIG. 22B, or circumferentially behind the tool (y direction) as shown in FIG. 22C, and can be located either within the tool holder, attached to it on the outside, or positioned near it, either in the circumferential or axial direction.

It is also noted that the camera system can view the tool from the direction out of the plane of the paper (y direction), as opposed to along the axis of the part (z direction), in order to see tool location in the x & z plane, as opposed to in the x & y plane. This can be useful for monitoring deflection of the tool due to radial and longitudinal feed forces as opposed to, in the drawings shown, the radial and circumferential (and tangential) forces.

It is noted that the contact member need not be in a hold carrying a tool, but can be in a special holder just for the purpose. Indeed in such a device contacts can point in more than one direction to make multiple measurements.

It is also noted that triangulation sensor, suitably miniaturized, can be attached to the tool holder, or built into same and used in place of contact member 1725 to monitor the part surface location in a non-contact manner.

Other techniques for monitoring, such as multiple edges, etc. Of the FIGS. above can be used which can increase accuracy, range or both.

FIG. 22D

For use in the apparatus of FIG. 22A, a member with multiple edges, preferably grating lines (on glass substrate) can be short, such that all the lines are always in the field of the lens. However, shown in FIG. 22D, is an arrangement somewhat different than that referenced in the copending application, where the member with lines is long, such that lines move in and out of the field. Light source 1760 illuminates a grating of parallel edges 1761 which is imaged by lens 1762 to form magnified image 1763 on the face of a DALSA 40 mhz linear diode array 1765 having 256 elements on 20 micron centers. If the line spacing is 200 microns, and magnifications 4:1, spacing on the array is 400 microns, or 40 elements per line—sufficient to resolve well the individual edges of the lines (256/40 of which are present at any one time on the average on the face of the array). The lines move in and out of the field of view, and if the array is fast enough, they can be tracked so as not to loose count. A 40 MHZ array with 256 elements can be operated at about 150,000 scans/second which gives the rate at which all edges can be sensed. Clearly if the lines move one line worth in this time, a tracking problem exists. however on 200 micron centers, this is 200×150,000 or 30 meters/second—much faster than most machines can move.

The grating as pointed out in the referenced application does not have to have equispaced, or equiwidth lines. It also can have one or more additional tracks, or at intervals, periodic or otherwise, use larger or smaller lines, which serve to code the grating in an absolute sense, or at least in such a way that the tracking requirements are eased. Such a coded grating is shown as 1770. With dual linear arrays or matrix arrays of more lines, all sorts of unique codes can be read.

Accuracy can also be improved by use of a matrix array to obtain an increased number of points on each edge, from which the statistical definition of the edge position is improved. Such techniques can easily yield accuracies of edge, and therefore surface location of $\frac{1}{32}$ pixel of the array. For a 10 micron array pitch, at 3:1 optical magnification, this is 0.1 micron—sufficient for all known applications of this type.

It is clear that if the elastic constants of the tool holder are known and the position of a point such as edge 1740 referencing the tool holder monitored, an inference of the cutting forces can be obtained. While the deflection of tools is very small, the fact is that a 1 um deflection (in either x or y, if a two axis detector is used) can still be measured to 1 part in 10 (or better) with the camera system as shown— sufficient to see much of the deflection or chatter encountered. On detection, chatter can be eliminated often by speeding up or slowing down the spindle speed or feed rate, or taking a smaller depth of cut.

In fact, the high frequency modulation of the tool point in space creates chatter, and if the reading array is a linear array, say operating at 5 khz, this can be detected. Analog detectors can be used to sense analog image changes at even higher rates. Such changes can simply be due to the amount of light in the illuminated zone, changing as a function of the shadow, if AC coupling is used to suppress DC components of an analog signal.

If the tools are designed appropriately this same monitoring system can be utilized with all tools in the machine or turret, or at least those used for OD finishing. It is noted that the lens and camera system are fixed to a machine portion that is independent of the turret location, and therefore can be used to eliminate measurement of errors independently in the turret. Indeed, for a relatively limited range of diameters, the measuring system can be located relative to a point on the machine that is independent of the movement of the cross slide of the machine in the z axis as well. Indeed edge 1726 can be viewed in the direction out of the plane of the drawing.

It should be noted that the optical contact gage has the advantage of being able to operate on coolant soaked surfaces, and one can better protect the optical system against coolant by shielding its path, using for example a tubular structure. Ideally turret designs will be such in the future as to incorporate light paths, electrical lines, air lines and other services useful for the invention.

FIG. 23A

FIG. A illustrates another gage (besides that of FIG. 10) for round parts, typically made on grinders, as shown in the invention. This gage is typically meant to be used while grinding, but can be used before or after grinding as well.

Typically the gage is utilized as shown, in which two sensor units, according to the invention, 1800 and 1801 are utilized to respectively check the opposite sides of the diameter of part 1803, either during grinding, or before or after grinding, for control purposes as disclosed here in the invention.

Measurement of part diameter is accomplished using probe tips 1810 and 1811 to contact part 1803, supported by tubular mounts 1812 and 1813, which are mounted to flexures 1815 and 1816, and are free to move in the plane of the drawing, and as will be discussed later, as well in an optional case, in the plane out of the drawing. The points, such as 1830 and 1831, are monitored this case, as opposed to FIG. 10 above, by individual camera systems, comprised of lens 1840 and 1850, which image the respective edge images 1830 and 1831, onto arrays 1845 and 1846. As described in the FIGS. above, the retro-reflective devices are used to send light from an on-axis light source (not shown), or other self-luminous sources, such as LEDs, can be located from the end of the tube 1813, for example, to illuminate the edge.

As in the measurement is made relative to the optical axis of the lens systems shown, which adds a degree of stability to the system, since the housings of units 1800 and 1801 can be particularly rugged, and themselves movable, using a motor driven, or manually actuated differential screw 1870, for example, to expand or contract the diameter between the sensor units. This allows the device to be used on a variety of different diameters in sequence, and with suitable encoding on the motor, the actual motor movements can attribute the accuracy.

Also shown is a novel method of calibrating the sensors individually, and any mechanical system (optional) to adjust them to different nominal diameters. In this case, an absolute reference plate 1880 is shown, having multiple landmark datums, such as illuminated lines 1881, which can be viewed by the same lens and camera systems of the sensors if the retroreflector or other device used has a hole, or a separate viewing channel is used. The sensors can be moved to different locations in the diameter direction, in order to zero from the landmark settings at any given time. If one considers the grinding wheel to be located along the axis of the part displaced in a position out of the plane of the paper, the reference plate is off to the side, therefore of the grinding wheel, and the sensor unit is moved axial from its position in the plane of the wheel to the reference position for calibration. Alternatively the grinding wheel can be backed off, and the master plate brought in front of the grinding wheel.

Also shown in this invention, in FIG. 23B, is a two axis version of the invention for looking at both a land location, or other feature in the axial direction of the part, as well as the OD direction, and the radial direction of the part, as shown.

The above sensor has significant advantages over conventional OD probes such as those of Marposs and Movomatic. Using simple apparatus, it measures absolutely to the very high accuracies described above over a large +/−0.2" range from a master setting. Operation is all digital, with no levers or other error prone mechanics. Using the positioning system such as 1870 shown, it can expand or contract to a wide range of diameters. The probe can also be used for IDs by reversing the direction of the contacts. A single probe can also be used for measurement of radial variation in parts, such as cam lobe lift profiles or base circle runouts.

FIGS. 23B and 23C

FIGS. 23B and 23C illustrate a use of a sensor somewhat similar to that of FIG. 23 for the purpose of sensing in a plurality of directions.

For example, if the probe of FIG. 23B is constructed in a manner similar to that of FIG. 20; namely to allow a ball contact at the end of the flexure responding probe barrel 1884 to move in position as the ball 1883 contacts the part (we assume this probe to be that of 1812 above), then it is clear that the lens will detect the image of the probe to be in a different x or z location, depending on whether the ball is moved in the x direction, or z direction as it comes into contact with the part. Or conversely, as the part is ground down at another point on the surface while the ball is in contact. Thus the probe can serve to both control the grinding of ODs (movement in x direction with change in ground size), and lands (movement in the z direction with change in ground size).

This, of course, requires that the diode array 1845 be of a type that can be responsive in two axes. Indeed, it may even be an analog sensor, such as UDT SC10, although these are not as digitally accurate as the drift free diode array systems, and are generally not as preferred. However, either one can sense the image of a self-luminous object, such as the small diode laser, or LED light source 1885, shown here being monitored for its position as a function of the location of ball 1883.

The version of FIG. 23C is somewhat different. In this case, there are physically two probes 1890, 1891 at the end of the sensor arm, and these can be either monitored by linear diode arrays at 90°, or other means. Indeed this allows one to be grinding or otherwise machining two surfaces at once, and controlling the position of the ground surface.

FIG. 24

FIG. 24 illustrates the use of the invention in the grinding of ID bores, such as those in bearing raceways, or fuel injectors. A good description of the problem associated with such grinding is described in U.S. Pat. No. 4,590,573 by Robert Hahn, particularly for example his FIG. 6. This patent discusses a computer control mechanism for the control of the grinding process, based on deflections and forces therein, particularly useful for rounding an other wise out of round bore (or other surface) in the shortest possible time via control of forces.

The invention herein can act to measure deflections of tools, and locations of part surfaces. It can thus improve the invention of Hahn which does not contain means or method to measure part location and control the process using this information—which is the true arbiter of part size and roundness and can only be inferred in the Hahn invention.

FIG. 24 illustrates ID grinding wheel 1900, grinding bore 1901 in part 1902, for example a fuel injector nozzle component.

The invention herein, using the optically sensed contact checking member, 1930, can sense the position in the x direction of the contact point 1930, whose member contacts the surface at point 1935 (FIG. 24B), by sensing the back end of the contact and its position relative to the optical axis 1945 of the camera system 1920, as disclosed above. This system can use a linear array or linear analog position sensitive image detection element for measuring in one direction, or a combination of linear devices or area devices for measuring in multiple directions as required. Where today's analog devices are used, such as detectors by SITEK (Sweden) or a UDT SC10, the image formed on the detector is not of edges, but of spots or zones of luminous intensity. This requires the "edge" of the member 1940 to be a luminous point, or the use of an illuminated slot, disc or other defined zone of light such as shown in FIG. 24C below.

As described above however, the digitally based imaging type systems have an advantage that they are more stable, and allow measurement of tool deflection under load (or statically) as well as contact position related to the part size or shape.

The grinding operation is removing material in the X direction, and the part 1902 is then rotated itself about its axis (Generally parallel to optic axis 1940) to allow different portions of the ID surface to be exposed to the grinding action. As the part is rotated,the contact 1935 in time can sweep out the total surface, and knowing the separation between the optic axis used to reference determination of the location of the opposite end of the member 1930, and the part axis at all times during rotation, a map of the bore surface can be obtained—to inspect the part after a particular time of grinding, or to control the process while grinding.

While the contact, for example, is depicted in the drawing of FIG. 24B, can be located at, let us say, the end of the probe tip, or toward the motor drive side, a novel arrangement shown in FIG. 24A in the side view illustrates a contact member, which if 360 degree response was needed, could be a thin round disc with a hole in it, (the inner edges of the hole being measured). The contact member is illuminated in this case, by an external light source 1941, rather than a retro reflective or self luminous versions noted above. For dry finish grinding this works well, but optical signals in the open can be interrupted by coolant, and light sources are generally inside the probe device, if the probe is to be used while grinding.

The 360 degree measuring capability allows the contact member to rotate with the wheel rather than remain stationary directed at the line of contact of the wheel to the part. This has advantages in construction.

This disk is urged by spring pressure exerted by a flexure (not shown for clarity )against the surface of the Part ID, in order to make contact during the grinding operation or for checking purposes after or before grind. While the axial extension of wheel 1900 containing the contact member along the axis is not ground, oscillatory motion of the wheel and sensor unit in the z direction (axial), allows this deficit to be overcome by averaging the grinding action along the z axis. This is accomplished using slideway 1960, on which the motor drive 1970 driving the grinding wheel is mounted. It also serves to move the wheel through the bore(if the wheel is not long enough to grind the whole axial length required at once) and to retract the system from the bore.

A control system can be incorporated along with that of the Hahn invention to make a co-ordinated force, and actual part location based system. In the particular novel features added here, the actual surface of the part is physically measured either between grinding passes, or to measure the surface before grinding in order to better control the actual grinding path in the case of the uneven conditions.

The system as described can measure the part ID radius at a given rotational position and if excessive, the computer controlling the operation can cause the grinding wheel to dwell longer at that location than at others, removing in one revolution or many, any such "high zones", determining when grinding action should be stopped by the reduction of the surface to the desired size or shape. Such zones can also be measured on a rapid pre-inspection pass, digitized into computer memory and then used during the grinding operation to correct the surface. Inspection after grind using the invention can then be used to verify function and to continue to refine the algorithms used to predict time of grinding from the size reduction obtained.

Tool deflection can also be directly monitored as shown above and used to send a signal to move the wheel to move it toward the part to correct the effect of the deflection. The force of such wheel positioning can be monitored to achieve the results desired.

While described here in terms of round parts, the disclosed invention is also usable for programmably grinding of surfaces such as those of turbine components, and other applications where intricate shapes are required. In this case the direction of grind can vary, requiring a multidirectional measuring head as disclosed above.

The optical systems disclosed herein can operate with any light that can be detected by the typical array based detectors that are used. This typically runs from the ultra-violet to the near infra-red. It should be noted to that the concepts herein, while preferably executed with linear array based systems, are not so limited, and in fact sensor systems of all optical types and other measuring types can be used herein. However, the array based systems over time have shown themselves to be the most useful for these tasks being drift free and capable of large ranges and high resolutions required.

Tool inspection by the invention can be done during part load unload cycles to cause the least effect on cycle time of the machine. Tool contour variation due to wear and the progressive degradation of the tool can be charted to allow a prediction to be made of the point of tool breakage, with such a prediction, tool inspections and part inspection frequency can be raised toward the end of tool life to assure that proper function is maintained. Force signals if available, can signal a break of the tool, to allow a safe shutdown of the operation.

There are numerous control scenarios possible for the disclosed intelligent machining systems. In the simplest case one simply measures the actual location of the part and offsets the machine's NC controller with an RS232 or other signal to the control, after the process step is complete. Most commercial controllers have this capability to take data from some outside gage source, as well as from their manual entry on the front panel.

What is claimed is:

1. A method for determining, in a machine tool, an edge related characteristic of a tool used to work a part, comprising the steps of:
    (a) illuminating the edge of said tool with light such that some of said light passes said tool edge;
    (b) imaging said light passing said tool edge onto an electro-optical image sensing device;
    (c) analyzing said image to determine the position of a plurality of points on said edge; and
    (d) from said analysis of said edge position, determining a characteristic of said tool.

2. A method according to claim 1 wherein step (d) comprises determining the size, shape or position of said tool edge.

3. A method according to claim 1 wherein the size, shape or position of said tool edge is determined to an accuracy of at least 0.001 inch.

4. A method according to claim 1, wherein said tool is a cutting tool, wherein said edge is a cutting edge, and wherein, in step (d), said tool characteristic comprises damage or wear of said cutting edge.

5. A method according to claim 1, wherein said tool is a grinding tool.

6. A method according to claim 1 further comprising, prior to step (a), moving the tool from an operating position for working on said part to a withdrawn position in which the tool is out of contact with said part;

carrying out steps (a) and (b) while said tool is in said withdrawn position; and returning said tool to said working position after carrying out steps (a) through (d).

7. A method according to claim 6 further comprising rotating the tool during steps (a) and (b).

8. A method according to claim 7 further comprising detecting when a predetermined relationship exists between the location of the tool edge and the rotational position of the tool, and, in response to the existence of said predetermined relationship, initiating out step (c).

9. Machine tool apparatus comprising means for determining an edge related characteristic of a tool used to work a part, said means comprising:

(a) means for illuminating the edge of said tool with light such that some of said light passes said tool edge;

(b) means for imaging said light passing said tool edge onto an electro-optical image sensing device;

(c) means for analyzing said image to determine the position of a plurality of points on said edge; and (d) means for determining from said analysis of said edge position a characteristic of said tool.

10. Apparatus according to claim 9 further comprising means for moving the tool from an operating position for working on said part to a withdrawn position in which said tool is out of contact with said part.

11. Apparatus according to claim 9 further comprising means for rotating the tool in said withdrawn position.

12. Apparatus according to claim 11 further comprising means for detecting wherein a predetermined relationship exists between a location of the tool edge and a rotational position of the tool.

13. Apparatus according to claim 9 wherein said tool is a cutting tool, and wherein said edge is a cutting edge.

14. A method for controlling the size of a part feature which is being produced by a machine tool, wherein a desired part feature size has been determined, comprising the following steps:

(a) moving a tool having a working edge from a working position for working on a part to an inspection location;

(b) imaging the working edge of said tool onto an electro-optical image sensing device;

(c) analyzing said image to determine the position of a plurality of points on said edge;

(d) determining, from said analysis of said edge position, a predicted part feature size which would be produced by said tool; and (e) if said predicted part feature size is different than said desired part feature size, adjusting the working position of said tool, modifying said tool, or exchanging said tool, to match said predicted part feature size with said desired part feature size within acceptable tolerances.

15. Machine tool apparatus comprising means for controlling the size of a part feature which would be produced by the machine tool, wherein a desired part feature size has been determined, said part size controlling means comprising:

(a) means for moving a tool having a working edge from a working position for working on a part to an inspection location;

(b) means for imaging the working edge of said tool onto an electro-optical image sensing device;

(c) means for analyzing said image to determine the position of a plurality of points on said edge;

(d) means for determining, from said analysis of said edge position, a predicted part feature size which would be produced by said tool; and (e) means for adjusting the working position of said tool, modifying said tool, or exchanging said tool, to match said predicted part feature size with said desired part feature size within acceptable tolerances.

* * * * *